(12) United States Patent
Berkson et al.

(10) Patent No.: US 11,015,566 B2
(45) Date of Patent: May 25, 2021

(54) SYSTEM FOR CONTROLLING POWER SUPPLIED TO A STARTER MOTOR

(71) Applicant: N4 Innovations, LLC, Scottsdale, AZ (US)

(72) Inventors: Bruce Richard Berkson, Sedona, AZ (US); Sean Robert Scherer, Tempe, AZ (US)

(73) Assignee: N4 Innovations, LLC, Scottsdale, AZ (US)

( * ) Notice: Subject to any disclaimer, the term of this patent is extended or adjusted under 35 U.S.C. 154(b) by 41 days.

(21) Appl. No.: 16/283,225

(22) Filed: Feb. 22, 2019

(65) Prior Publication Data

US 2020/0072178 A1 Mar. 5, 2020

Related U.S. Application Data

(60) Provisional application No. 62/725,493, filed on Aug. 31, 2018.

(51) Int. Cl.
| | | |
|---|---|---|
| *F02N 11/08* | (2006.01) | |
| *B60R 16/033* | (2006.01) | |
| *H02J 7/00* | (2006.01) | |
| *B60R 16/03* | (2006.01) | |
| *B60W 10/06* | (2006.01) | |

(Continued)

(52) U.S. Cl.
CPC .......... *F02N 11/0866* (2013.01); *B60R 16/03* (2013.01); *B60R 16/033* (2013.01); *B60W 10/06* (2013.01); *B60W 10/26* (2013.01); *B60W 20/10* (2013.01); *F02N 11/0848* (2013.01); *H02J 7/0068* (2013.01); *B60K 6/485* (2013.01); *B60W 2510/244* (2013.01); *B60Y 2200/92* (2013.01);

(Continued)

(58) Field of Classification Search
CPC ... B60W 10/06; B60W 10/26; F02N 11/0866; B60R 16/03; B60R 16/033; F20N 11/0848; F20N 11/0896
See application file for complete search history.

(56) References Cited

U.S. PATENT DOCUMENTS

| 5,998,885 A | 12/1999 | Tamor et al. |
| 9,868,409 B2 | 1/2018 | Cook et al. |

(Continued)

FOREIGN PATENT DOCUMENTS

WO 2001034424 A1 5/2001

OTHER PUBLICATIONS vicorpower.com, "Non-Isolated Fixed-Ratio Bus Converter Module", ChiP™, NBM™, May 2018 (1 p).

(Continued)

*Primary Examiner* — Jeffrey M Shin
(74) *Attorney, Agent, or Firm* — Young Basile Hanlon & MacFarlane, P.C.

(57) ABSTRACT

Vehicle power control is described. A vehicle power control system includes a battery having a first voltage, a starter motor having a second voltage, a power converter, and a system controller. The second voltage is higher than the first voltage. The starter motor is coupled to a crankshaft of an internal combustion engine. The power converter is in electrical communication with the battery and the starter motor and is configured to convert the first voltage to the second voltage. The system controller is configured to supply energy from the battery to the starter motor to start the internal combustion engine.

18 Claims, 18 Drawing Sheets

(51) Int. Cl.
  *B60W 10/26* (2006.01)
  *B60W 20/10* (2016.01)
  *B60K 6/485* (2007.10)
(52) U.S. Cl.
  CPC ... *B60Y 2400/61* (2013.01); *F02N 2011/0896* (2013.01)

(56) References Cited

U.S. PATENT DOCUMENTS

| | | |
|---|---|---|
| 2007/0131408 A1 | 6/2007 | Zeigler et al. |
| 2009/0171521 A1 | 7/2009 | Moki et al. |
| 2009/0314561 A1 | 12/2009 | Handa |
| 2011/0288743 A1 | 11/2011 | Smith |
| 2014/0171260 A1 | 6/2014 | Dalum |
| 2014/0265559 A1 | 9/2014 | Leehey et al. |
| 2015/0226147 A1* | 8/2015 | Hirabayashi ........ F02D 41/2451 701/103 |
| 2017/0253231 A1* | 9/2017 | Ciaccio ............... H01M 10/615 |
| 2018/0050685 A1* | 2/2018 | Atluri ................. B60W 10/026 |

OTHER PUBLICATIONS

Vicor., "BCM® in a VIA Package Bus Converter", Isolated Fixed-Ratio DC-DC Converter, Rev. 2.0, Feb. 2018 (8 pp).

Haque, A., "Operation and Control of Bidirectional DC-DC Converter For HEV", International Journal of Latest Engineering Research and Applications, vol. 2, Iss. 10, Oct. 2017, pp. 30-37 (8 pp).

Texas Instruments, "TI Designs: TIDA-01168, Bidirectional DC-DC Converter Reference Design For 12-V/48-V Automotive Systems", TIDUCS2B, Jun. 2017, Revised Mar. 2018 (80 pp).

Kalnoskas, A., "Converter for 48/12-V vehicle dual-battery systems handles more current", Power Electronic Tips, https://www.powerelectronictips.com/converter-for-4812-v-vehicle-dual-battery-systems-handles-more-current/, Sep. 2016 (7 pp).

Digi-Key, "Design Considerations for Dual-Voltage Automotive Power Systems", Digi-Key Electronics, Article Library, Digi-Key North American Editors, Feb. 2017, https://www.digikey.com/en/articles/techzone/2017/feb/design-considerations-for-dual-voltage-automotive-power-systems (8 pp).

Martin, "Chevrolet Volt Battery Thermal Management", MACS Service Reports, dated Dec. 2021, 9 pgs.

Seong et al., "Control Strategies for Vehicle Suspension System Featuring Magnetorheological (MR) Damper", Vibration Analysis and Control—New Trends and Developments, www.intechopen.com, published Sep. 6, 2011, 20 pags.

* cited by examiner

SYSTEM FOR CONTROLLING POWER SUPPLIED TO A STARTER MOTOR

CROSS-REFERENCE TO RELATED APPLICATION

This application claims priority to U.S. Provisional Patent Application No. 62/725,493, filed Aug. 31, 2018, which is incorporated herein in its entirety by reference.

TECHNICAL FIELD

This disclosure relates to vehicular power optimization and engine idle reduction.

BACKGROUND

Vehicles that idle for prolonged periods of time, including but not limited to police vehicles, taxis, limousines, delivery, utility, and construction trucks, burn thousands of gallons of fuel each year while idling. In many cases, idle times exceed drive times. Long duration idling results in increased fuel costs, increased engine maintenance costs, engine damage, and increased emissions. Drivers of prolonged-idle vehicles often use their radios, lights, heaters, air conditioning, and other accessories while idling. These added accessories can overload the original equipment manufacturers' (OEM) electric systems and cause batteries, starters, and/or alternators to experience high failure rates. Typical idle reduction strategies turn off the engine any time the vehicle is at rest and/or in a state of prolonged idle. However, drivers often will not voluntarily turn off cabin air conditioning or heating when cabin temperatures become uncomfortable.

SUMMARY

One aspect of this disclosure is a vehicle power control system comprising a battery having a first voltage, a starter motor having a second voltage, a power converter, and a system controller. The second voltage is higher than the first voltage. The starter motor is coupled to a crankshaft of an internal combustion engine. The power converter is in electrical communication with the battery and the starter motor and is configured to convert the first voltage to the second voltage. The system controller is configured to supply energy from the battery to the starter motor to start the internal combustion engine.

Another aspect of this disclosure is a vehicle comprising a first circuit, a second circuit, a power converter, a power source, a starter motor, and a system controller. The first circuit operates at a first voltage. A second circuit operates at a second voltage, where the second voltage is higher than the first voltage. The power converter is in electrical communication with the first circuit and the second circuit and is configured to maintain a ratio between the first voltage and the second voltage. The power source is in electrical communication with the first circuit such that a target output of the power source is at the first voltage. The power source comprises at least one battery. The starter motor is coupled to a crankshaft of an internal combustion engine. The starter motor is in electrical communication with the second circuit such that a target output of the starter motor is at the second voltage. The system controller is configured to supply energy to the starter motor only from the at least one battery. Energy is supplied to the starter motor from the at least one battery in response to receiving a signal indicative of a request to start the internal combustion engine.

Another aspect of this disclosure is a method of controlling power in a vehicle. The method includes in response to receiving a signal indicative of a request to start an internal combustion engine from a sensor, supplying energy from a battery having a first voltage to a power converter. The method includes converting the first voltage to a second voltage using the power converter, wherein the second voltage is more than the first voltage. The method includes supplying, to a starter motor having a second voltage, only the energy from the battery. The starter motor is coupled to a crankshaft of the internal combustion engine.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Unless otherwise noted, like numerals represent like elements within the drawing figures.

DETAILED DESCRIPTION

Long duration idling results in wasted fuel, added engine maintenance costs, and can result in damage to gasoline and diesel engines caused by reduced lubrication that increases engine wear, cylinder glazing, and piston slap. Accordingly, costly engine rebuilds or complete vehicle replacements are sometimes required for prolonged-idle vehicles. Vehicle engines idled for prolonged periods of time can also create a cooling effect on the catalytic converter that increases the engine's unburned hydrocarbon emissions and elevates nitrous oxide emissions. Reducing engine idle extends the usable life of vehicle components and reduces fuel, maintenance, and repair costs. Additionally, vehicle idle reduction systems that rely solely on OEM low voltage output often exceed the OEM low voltage output capacity and cannot maintain adequate autonomous charge-sustaining operation. This can result in motor, battery, and/or controller failure due to excessive heat and energy demand.

The vehicle power control system described herein reduces or eliminates engine idle by inventively controlling electrically-powered components, such as an electric air conditioning compressor and an electric heater manifold, integrated into a vehicle's heating, ventilation, and air conditioning (HVAC) system. The vehicle power control system reduces or eliminates engine idle by enabling electric operation of vehicle heating and cooling while the vehicle engine is off without high-voltage battery support. The vehicle power control system is controlled by a system controller that supplies excess energy produced by the vehicle's alternator to an alternate power unit for energy storage. The system controller described herein supplies energy stored in the alternate power unit to high-voltage vehicle accessories such as the electric air conditioning compressor, the electric heater manifold, a starter motor generator unit, and/or magnetorheological dampers. Alternatively, the vehicle power control system can power high-voltage vehicle accessories with low-voltage batteries by converting low-voltage input to high-voltage output using a power converter that may be continuously energized.

Physical vehicle improvements and inventive controls designed to adapt conventional internal combustion-based vehicles into vehicles having reduced or no idle are also described herein. These adaptations may take place at the OEM factory or may be retrofit to existing internal combustion vehicles.

Figure 1:
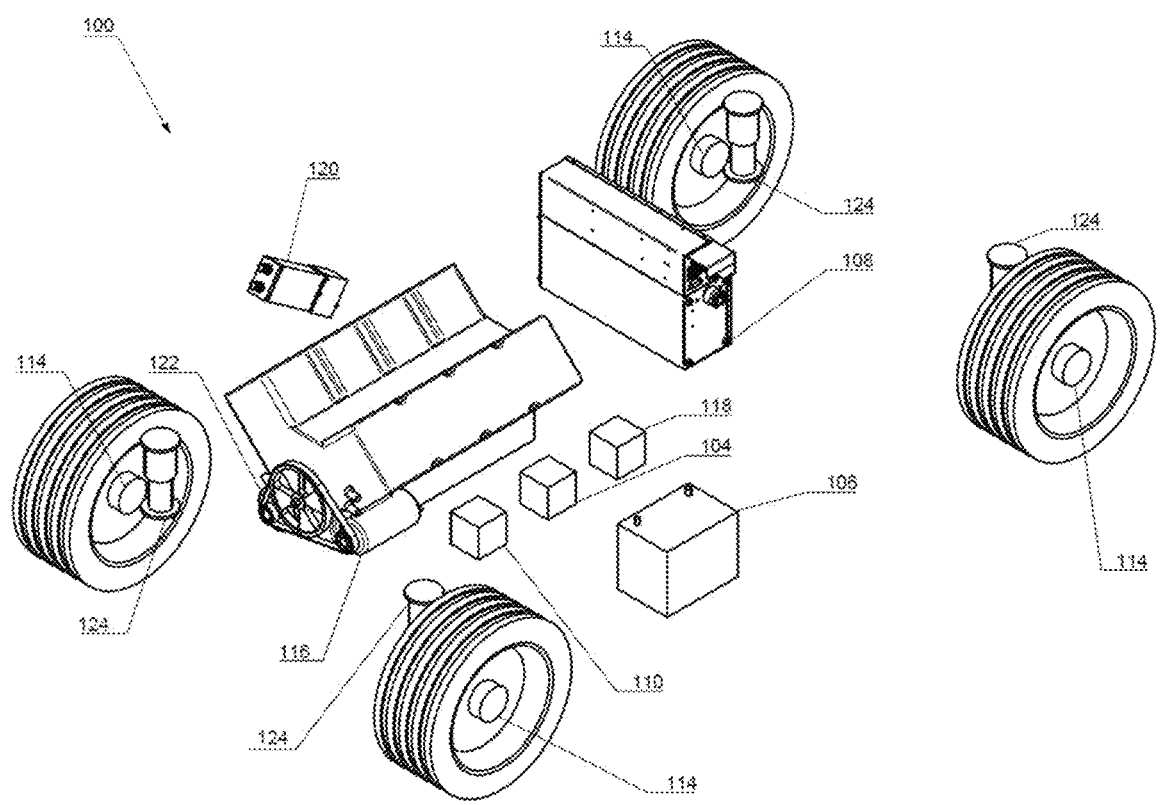
FIG. 1 is a diagram illustrating components of a vehicle power control system.

FIG. 1 is a diagram illustrating components of a vehicle power control system 100. The vehicle power control system 100 interacts with an engine 102. In the illustrated example, the vehicle power control system 100 includes a bidirectional power converter 104 interconnected by appropriate wiring between a first circuit and a second circuit. The first circuit may include a circuit, system, side, rail, or bus operating at a first voltage. The second circuit may include a circuit, system, side, rail, or bus operating at a second voltage. The first voltage may also be referred to as a first demanded voltage or as a second supplied voltage, and the second voltage may also be referred to as a first supplied voltage or as a second demanded voltage.

The bidirectional power converter 104 converts the first voltage of the first circuit to the second voltage of the second circuit. The bidirectional power converter 104 can also convert the second voltage to the first voltage. In some embodiments, the first voltage is 12-volts and the second voltage is 48-volts. The first voltage and the second voltage may be any other voltage, as long as the first voltage and the second voltage are different. Generally, the first voltage is less than the second voltage. For example, electrical components in electrical communication with the first circuit may operate at a voltage of 5-30 volts. Electrical components in electrical communication with the second circuit may operate at a voltage above 30 volts, such as 48 volts.

OEM components or components of the vehicle power control system 100 may be in electrical communication with, or form part of the first circuit or the second circuit. The first circuit may include a starter battery 106. An alternate power unit 108 may be included in the first circuit or the second circuit, depending upon its operating voltage. In this description, the alternate power unit 108 is mostly described as being included in the second circuit for simplicity of explanation, but the alternate power unit 108 may perform the same functions if it is included in the first circuit. The bidirectional power converter 104 may be energized into continuous conduction mode to provide a (e.g., high) voltage output to the second circuit and any high voltage accessories in electrical communication with the second circuit such as an electric air conditioning compressor 118, an electric heater manifold 120, a starter motor generator unit 122, or magnetorheological dampers 124 with or without requiring high voltage battery support.

In some embodiments, the bidirectional power converter 104 may convert 12-volt power to 48-volt power to recharge the alternate power unit 108, or to provide electricity to the electric air conditioning compressor 118 and/or the electric heater manifold 120. Additionally, or alternatively, the 48-volt power may be used to support the OEM 12-volt electric system by transferring power from a component in electrical communication with the second circuit at 48 volts, converting the power to 12 volts and supplying the power to a component in electrical communication with the first circuit. In one example, the bidirectional power converter 104 may boost 12 volts output by any described power source voltage by 400 percent to 48 volts and supply the boosted voltage to any described component.

The bidirectional power converter 104 may maintain a ratio between the first voltage and the second voltage. In some embodiments, the bidirectional power converter 104 maintains a ratio of 4:1 between the second voltage and the first voltage. The ratio may include any other ratio. The bidirectional power converter 104 may maintain the ratio by iteratively measuring at a high frequency the first voltage and second voltage and converting the first voltage to the second voltage or the second voltage to the first voltage in response to the measurements. A bidirectional power converter controller 1330 (see FIG. 13) may control the bidirectional power converter 104 to maintain the ratio.

The bidirectional power converter 104 may include an internally non-isolated or isolated bidirectional power converter. The bidirectional power converter 104 may be externally isolated by DC contactors, MOSFET field-effect transistors, or other means of electrical decoupling. In embodiments including an isolated bidirectional power converter, a buck-boost converter 110, any type of low voltage to high voltage converter, or high voltage power source may be operably connected to the isolated bidirectional power converter. The buck-boost converter 110 can energize the bidirectional power converter circuits or rails at the second voltage into continuous conduction mode. In embodiments including a non-isolated bidirectional power converter, the non-isolated bidirectional power converter may automatically energize the bidirectional power converter circuits or rails at the second voltage into continuous conduction mode in response to power being supplied to the first circuit.

The starter battery 106 includes one or more 12-volt OEM starter batteries or batteries of any other voltage or type. The starter battery 106 may provide energy to a starter motor during startup of the engine 102 or may be a power source for any described component. The starter battery 106 may also receive energy from another power source.

The alternate power unit 108 may include modular thermally managed rechargeable batteries adapted to store energy that can be distributed as a transportable electric grid micro-source power generator. The alternate power unit 108 may include one or more 12-volt batteries, 48-volt batteries, or batteries of any other voltage or type, including but not limited to lead-acid, nickel metal hydride, or lithium ion batteries. The alternate power unit 108 may be a power source for any described component. For example, electrically-powered lights and other accessories of a vehicle may be supported by the alternate power unit 108 from power supplied through the bidirectional power converter 104, enabling the starter battery 106 to be supported in starting and running the engine. This can result in prolonging the life of engine components. Further details of an implementation of the alternate power unit 108 are described below in regard to FIGS. 5 and 6.

The vehicle power control system 100 may include regenerative electric brakes 114 that can generate electric power to be supplied to the alternate power unit 108. The bidirectional power converter 104 can convert excess power from an alternator 116 to the alternate power unit 108. For example, the output of the alternator 116 may charge the alternate power unit 108 while the engine 102 is running. The alternator 116 may be a 12-volt alternator, a 48-volt alternator, or any other alternator. Accordingly, the alternator 116 may be included in the first circuit or the second circuit, depending upon its operating voltage.

The starter motor generator unit 122 may be associated with the engine 102. The starter motor generator unit 122 may supply motive power in conjunction with the engine 102 so as to increase motive power and/or fuel efficiency of the engine 102, and thus the vehicle as a whole. The starter motor generator unit 122 may generate electric power that can then be supplied to rechargeable batteries of the alternate power unit 108. Further details of an implementation of the starter motor generator unit 122 are described below in regard to FIG. 10-12.

The magnetorheological dampers 124 or any type of electro-magnetic shock absorbers may be associated with chassis components of a vehicle. High voltage power (e.g. 48 volts) may be supplied to the magnetorheological dampers 124 to optimize performance of the magnetorheological dampers 124.

Figure 2:
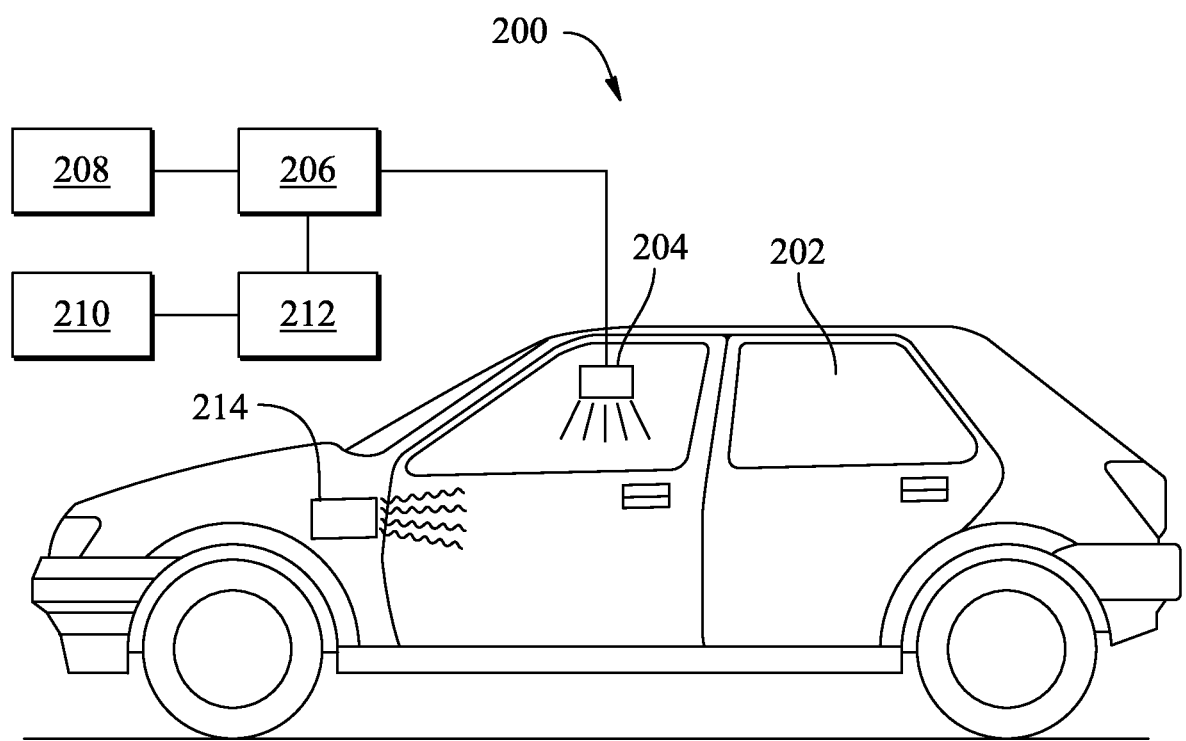
FIG. 2 is a diagram illustrating a vehicle having sensors detecting conditions in a passenger compartment of a vehicle into which the vehicle power control system of FIG. 1 may be incorporated.

FIG. 2 is a diagram illustrating a vehicle 200. The vehicle 200 can include any type of passenger vehicle such as a car, truck, or the like. The vehicle 200 includes a passenger compartment 202 where the driver sits to operate the vehicle 200 and passengers may be seated. One or more sensors 204 may sense or detect parameters and conditions within the passenger compartment 202.

The sensors 204 may measure various gas levels (e.g. carbon monoxide), temperature, occupant presence, or any combination of these conditions or others within the passenger compartment 202. The sensors 204 may be adapted to measure occupant presence within the passenger compartment 202 using a motion detector, such as an infrared sensor, pressure sensors in the seats of the vehicle, or any other suitable sensor or combination of sensors. When one or more occupants is within the vehicle 200, for example, a sensor of the sensors 204 may detect the presence and automatically activate the electric air conditioning compressor 118 and/or the electric heater manifold 120. A sensor may detect occupants of any type, size, or weight. The occupants may include adults, children, or pets.

The vehicle power control system 100 may include one or more sensors 204 adapted to provide full redundancy to OEM sensors of the vehicle 200, including but not limited to voltage sensors, current sensors, resistance sensors, shunt sensors, or hall effect current sensors, impact inertia sensors, temperature sensors, hood latch sensors, and any other sensors. In some embodiments, voltage dividers may use analog-to-digital converters to provide voltage and temperature sensing via thermistors or discrete digital temperature sensors. Any sensor 204 described herein may be in electrical communication with any described controller or component through an input/output (I/O) pin, digital or analog output, or bus. Any described sensor 204 may be monitored remotely using Controller Area Network bus (CANbus) communications.

An electronic control module (ECM) or electronic control unit (ECU) 206 is operably connected to the one or more sensors 204. A power management system controller (described below) is operably interconnected to the ECU 206. The power management system controller is part of the hardware that implements HVAC control described herein.

As shown in FIG. 2, an HVAC controller 208 (which may be referred to as a HVAC control module signal replicator/generator) is also operably interconnected to the ECU 206. The HVAC controller 208 may replicate the signals generated by an OEM HVAC controller to control the OEM HVAC system, including an OEM cooling system 210 and the OEM heating system 212, when the engine 102 is running. The HVAC controller 208 also controls the electric air conditioning compressor 118, the electric heater manifold 120, and an electric coolant pump 332 (see FIG. 3) when the engine 102 is idling or is not running.

The electric air conditioning compressor 118 can function with the OEM cooling system 210 to cool the passenger compartment 202. The electric air conditioning compressor 118 may operate at 12-volts, 48-volts, or at any other voltage. The electric air conditioning compressor 118 is integrated with refrigerant lines of a mechanical air conditioning compressor 302 (see FIG. 3). The mechanical air conditioning compressor 302 may be an OEM mechanical air conditioning compressor.

The electric heater manifold 120 can function with the OEM heating system 212 to heat the passenger compartment 202, and may operate at 12-volts, 48-volts, or at any other voltage. The electric heater manifold 120 may be in fluid communication with OEM refrigerant lines in a T, Y, or other configuration. The electric heater manifold 120 may be integral with the refrigerant lines as described below in regard to FIG. 3.

The vehicle 200 includes a blower 214 for blowing cool air from the electric air conditioning compressor 118 or OEM cooling system 210, heated air from the electric heater manifold 120 or OEM heating system 212, filtered air from outside of the vehicle, or interior air recirculated back into the passenger compartment 202 of the vehicle 200. Exterior air may be circulated into the passenger compartment 202 of the vehicle 200 if air outside of the vehicle 200 is at a more desirable temperature than the air within the passenger compartment 202 or if the detected contaminant levels within the air of the passenger compartment 202 are determined to be too high. The blower 214 may blow the exterior filtered air that may be used to flush out the contaminated air from within the passenger compartment 202 of the vehicle 200.

If the temperature within the passenger compartment 202 is detected to be in excess of a predetermined range of temperatures, the HVAC controller 208 can activate either the electric heater manifold 120 or the electric air conditioning compressor 118 to bring the temperatures in the passenger compartment 202 within the desired predetermined temperature range. The electric air conditioning compressor 118 and/or the electric heater manifold 120 may be used independently or in conjunction with the OEM cooling system 210 and the OEM heating system 212. For example, the desired temperature range may be set between 65° F. and 85° F. The passenger of the vehicle 200 may be able to adjust the vehicle thermostat to a desired internal temperature within the passenger compartment 202, and the air entering the passenger compartment 202 will be heated or cooled accordingly. In some implementations, the ECU 206 may be operably connected to the ignition of the engine 102 such that the ECU 206 can shut off the engine when the one or more sensors 204 detect that the carbon monoxide level within the passenger compartment 202 rises above a predetermined level. The ECU 206 may also be used to shut off the engine 102 and prevent it from idling unnecessarily. The teachings herein further contemplate the automatic or manual restart of the engine 102. For example, the engine 102 may be manually restarted when the driver depresses the brake pedal of the vehicle 200. Further details of the power management control according to the teachings herein are described starting at FIG. 13, after implementations of physical vehicle improvements are described.

Figure 3:
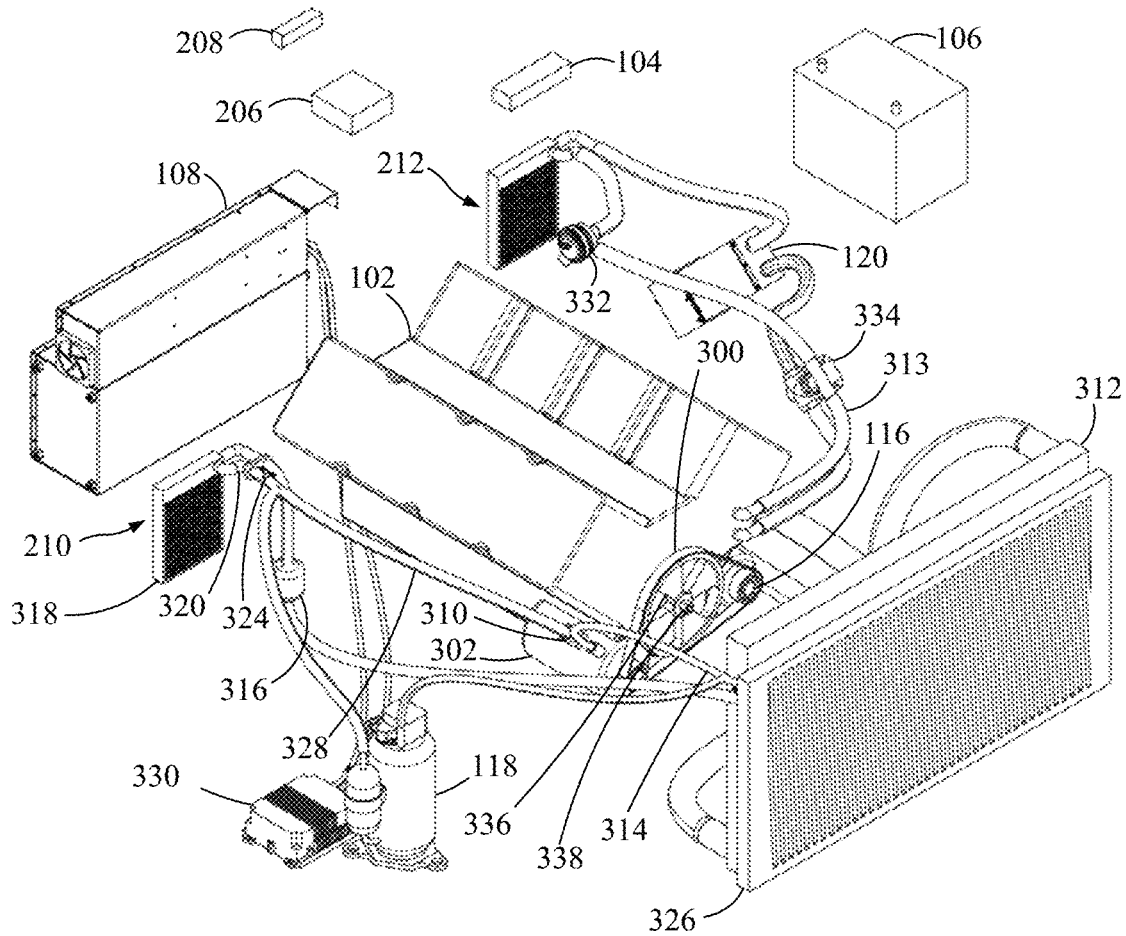
FIG. 3 is a diagrammatic view of an engine including portions of the vehicle power control system of FIG. 1.

FIG. 3 is a diagrammatic view of the engine 102 with certain details of the vehicle power control system 100. The engine 102 as shown is an internal combustion engine and includes an engine block, pistons, crankshafts, camshafts and the like. The alternator 116 is mounted on the engine 102 and generates electricity for recharging the starter battery 106. The alternator 116 may be coupled to a system or belts and pulleys represented by a drive belt 300 that powers low-voltage systems of the vehicle, such as the vehicle 200. The mechanical air conditioning compressor 302 is mounted to, or otherwise associated with, the engine 102 for producing cool air. Control of the mechanical air conditioning compressor 302 may correspond to a compressor on/off relay. A system of belts and pulleys impart rotational energy from a crankshaft of the engine 102 to the alternator 116 and the mechanical air conditioning compressor 302.

The mechanical air conditioning compressor 302 may include a variable displacement valve 310, which varies the amount of refrigerant compressed per cycle in the mechanical air conditioning compressor 302. The OEM HVAC control module or controller may monitor and process various sensor and control inputs from throughout the vehicle 200 to optimize the control of the variable displacement valve 310.

The engine 102 includes a radiator 312 and other components, such as a thermostat and a water pump (not shown), for thermal management of the engine 102. To provide cool, conditioned air to the passenger compartment 202 of the vehicle 200, refrigerant such as Freon, R-134a, or HFO1234-YF, is compressed by the mechanical air conditioning compressor 302 and passed through a refrigerant line 314 to the condenser 326. The refrigerant flows to an accumulator 316 where it is then passed to an evaporator 318. The evaporator 318 evaporates the compressed refrigerant to create an endothermic condition where heat may be removed and cool air may be produced. The evaporated refrigerant is then passed through a refrigerant line 320, through one or more orifices of a refrigerant charge tube 324, and then returned to the mechanical air conditioning compressor 302 through one or more refrigerant lines 328.

Heated air is provided from heat generated by heat elements or the engine via coolant pumped into the passenger compartment 202 through the heater core. Air may be passed through the heater core and heated. The heated air may be filtered.

This mechanical OEM HVAC system relies on the engine 102 to operate, encouraging engine idling while the vehicle is parked. Certain physical vehicle improvements in the vehicle power control system 100 can reduce engine idling while the vehicle is parked.

The bidirectional power converter 104 is shown without detail in FIG. 3, but it may convert power through MOSFET or similar high current-carrying transistors, contactors or relays mounted on a printed circuit board or an alternate architecture. The bidirectional power converter 104 may be physically mounted in a weatherproof heat-sink or heat exchanging enclosure, either near or spaced apart from the engine 102.

Figure 4:
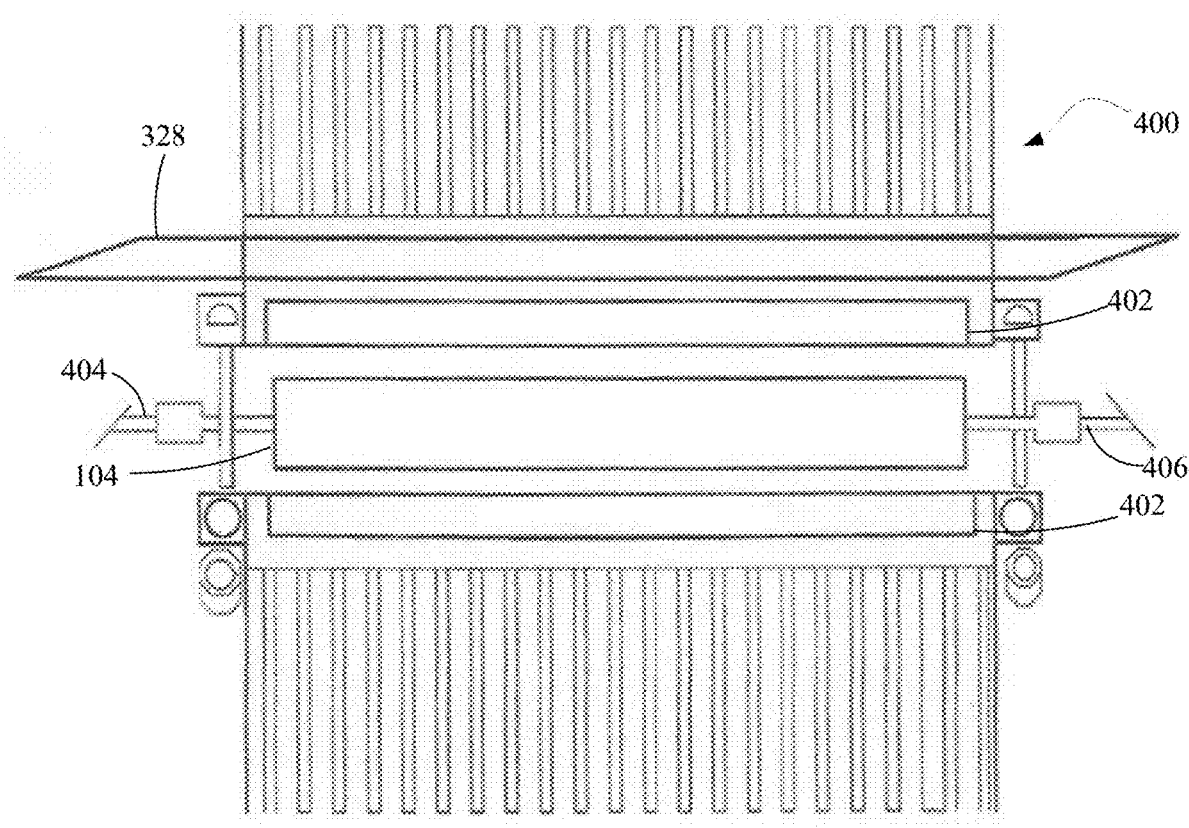
FIG. 4 is a cut-away perspective view of a heat exchanger enclosing a power converter.

FIG. 4 shows one example of a location for mounting the bidirectional power converter 104 relative to the engine 102 so as to remove heat from the bidirectional power converter 104. In the cut-away perspective view of a heat exchanger 400 in FIG. 4, the bidirectional power converter 104 is mounted within a recess or a recessed space 402 defined by the heat exchanger 400. The heat exchanger 400 may be made of weather-proof materials and may act as a heat sink or heat exchanger for the bidirectional power converter 104. The recessed space 402 may include a cavity, opening or any other interior space of the heat exchanger 400 that is able to effectively enclose the bidirectional power converter 104, to protect it from external conditions.

In some embodiments, the heat exchanger 400 is mounted to and around any of the refrigerant lines of the engine 102 such that refrigerant flowing through the refrigerant lines cools the bidirectional power converter 104. For example, the heat exchanger 400 may be mounted on a refrigerant line of the OEM HVAC system at a position that routes the refrigerant line near the bidirectional power converter 104. In this position, the refrigerant line exchanges heat with the bidirectional power converter 104 and carries the exchanged heat away from the components of the bidirectional power converter 104 any time the air conditioning compressors are operating. In FIG. 4, the heat exchanger 400 is mounted about the low-pressure refrigerant line 328. While the heat exchanger 400 is shown housing the bidirectional power converter 104, the arrangement shown may be used to surround any electronic component of the HVAC system that would benefit from cooling. The heat exchanger 400 may include fins or any other protrusions to remove heat from the electrical component connected to the heat exchanger 400.

The bidirectional power converter 104 may operably communicate with the OEM HVAC controller, the HVAC controller 208, and the ECU 206 for power management control. The bidirectional power converter 104 may be in electrical communication with the alternate power unit 108, the electric air conditioning compressor 118, and the electric heater manifold 120 for power management control. As shown in FIG. 4, the communications may be made using wires or other connectors through a first cable or tube 404 and/or a second cable or tube 406 extending from the recessed space 402 within the heat exchanger 400 to the environment external of the heat exchanger 400.

Figure 5:
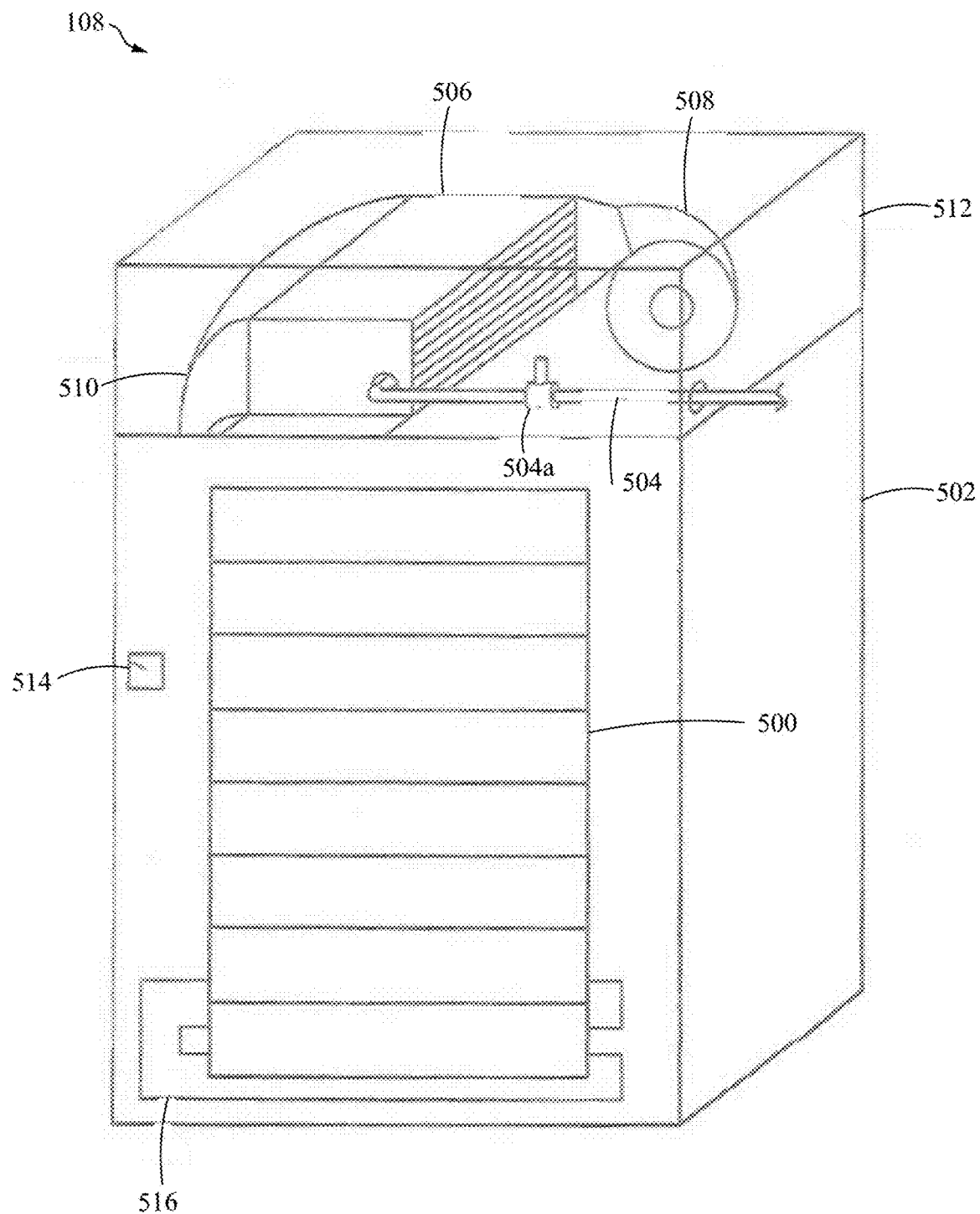
FIG. 5 is a diagrammatic view of an alternate power unit according to a first example.
Figure 6:
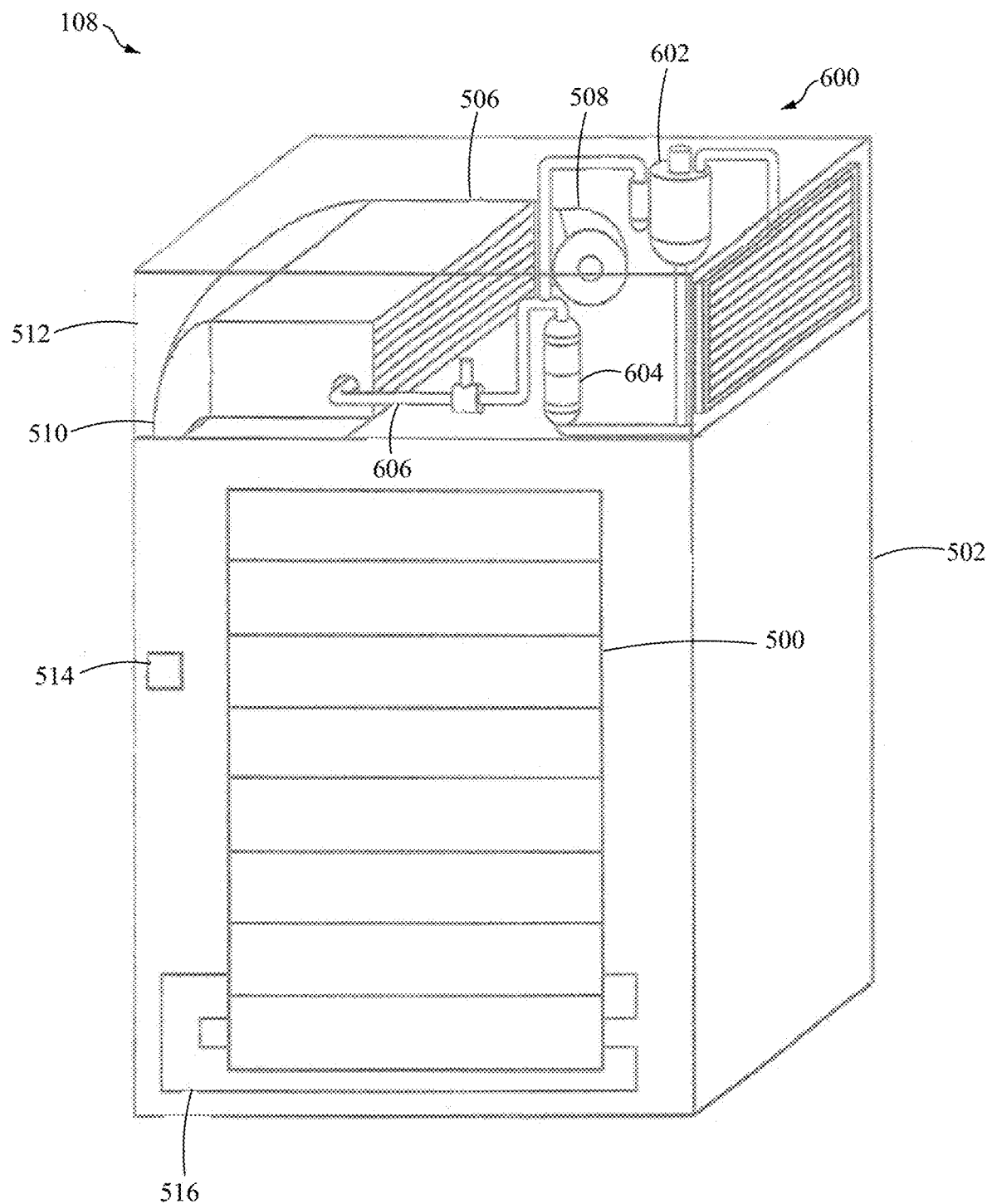
FIG. 6 is a diagrammatic view of an alternate power unit according to a second example.

Referring again to FIG. 3, the alternate power unit 108 is represented with its operable connection to the ECU 206, and through the ECU 206 to the HVAC controller 208. FIGS. 5 and 6 show additional details of how the alternate power unit 108 may be incorporated into the vehicle 200.

FIG. 5 is a diagrammatic view of the alternate power unit 108 according to a first example. The alternate power unit 108 includes one or more rechargeable batteries 500 connected to and enclosed by a housing 502. The rechargeable batteries 500 may be connected to the housing 502 inside an enclosure defined by the housing 502. Refrigerant flowing through refrigerant lines of the vehicle 200 may be passed through a tube 504 into an evaporator 506, where the refrigerant expands and cools the air within the evaporator 506. The alternate power unit 108 may include an expansion valve 504a disposed in the tube 504. A fan 508 is used to direct air over the evaporator 506, through a duct 510, and into the enclosure to cool the rechargeable batteries 500. The tube 504, the evaporator 506, the fan 508, and the duct 510 may be disposed near a top portion of the housing 502 or in any other location and may be enclosed by a lid 512.

One or more temperature sensors 514 may be embedded into the battery pack and may detect a temperature of the rechargeable batteries 500. The temperature as measured may be used to manage the temperature of the rechargeable batteries 500. For example, the rechargeable batteries 500 may be selectively cooled when the detected temperature is above a defined temperature, such as 90° F. Additionally or alternatively, the rechargeable batteries 500 may be cooled by passing OEM air conditioning low-pressure refrigerant lines around or through a liquid or dry heat exchanger (in a similar manner as described with regards to the heat exchanger 400), or simply in an open coil or looped configuration, located in the housing 502. The rechargeable batteries 500 may be cooled by imparting cold air indirectly by gravity or by fan-forced induction to the rechargeable batteries 500. Additionally, or alternatively, the rechargeable batteries 500 may be cooled using a self-contained electric heat pump, thermo-electric couplers, liquid cooling, and/or any other cooling mechanism.

The rechargeable batteries 500 may also be heated to maintain the rechargeable batteries 500 within a defined temperature range. For example, when the one or more temperature sensors 514 detects that the temperature of the rechargeable batteries 500 exceeds a defined lower temperature threshold, the rechargeable batteries 500 may be heated. The rechargeable batteries 500 may be heated by supplying electricity to one or more electric heating elements 516 connected to the housing 502. The one or more electric heating elements 516 may be disposed near a lower portion of the housing 502 or in any other location. The one or more electric heating elements 516 may heat the rechargeable batteries 500 to maintain the temperature of the rechargeable batteries 500 within the defined temperature range. The electric heating elements 516 may include one or more resistive heating elements, a self-contained electric heat pump, thermo-electric couplers, or any other electrically powered heating mechanism. The electric heating elements 516 may be powered by any of the power sources described herein.

FIG. 6 is a diagrammatic view of the alternate power unit 108 according to a second example. The alternate power unit 108 is similar to that in FIG. 5, except that the alternate power unit 108 of FIG. 6 includes a cooling system 600 for managing the temperature of the rechargeable batteries 500.

In the illustrated example, the cooling system 600 is disposed near a top portion of the housing 502 and is enclosed by the lid 512. The cooling system 600 may be located in any other location. The cooling system 600 includes the evaporator 506, the fan 508, and the duct 510 described with regards to FIG. 5. The cooling system 600 includes a compressor 602 and a condenser 604 and may include any other components necessary to create a self-contained cooling system. The tube 606 may be used to supply refrigerant to the evaporator 506 from the compressor 602 after being passed through the condenser 604. The tube 606 may remain coupled to the refrigerant lines of the vehicle 200 such that any low-pressure refrigerant line of the vehicle 200 may be routed through the evaporator 506. Valves or the like may be included and actuated to direct compressed refrigerant into the evaporator 506 and to activate the fan 508. The cooling system 600 may operate whether the engine 102 is running or off because, according to this description, the air conditioning system is capable of electric or mechanical air conditioning operation.

The alternate power unit 108 may be connected to the vehicle 200 in any location. For example, the alternate power unit 108 may be disposed under the hood, in the passenger compartment 202, or in a trunk of the vehicle 200. The housing 502 may be comprised of material that shields components held therein from electromagnetic signal emissions and thermal transmission generated by their operation in the vehicle 200.

Referring again to FIG. 3, the alternate power unit 108 may be supplied with electric power from the bidirectional power converter 104. The alternate power unit 108 may provide electric power to the electric air conditioning compressor 118. The electric air conditioning compressor 118 may be operably connected to the HVAC controller 208 by an electric compressor motor controller 330 for actuation. The electric air conditioning compressor 118 is integrated with the refrigerant lines 314, 328 of the OEM cooling system 210.

Figure 7A:
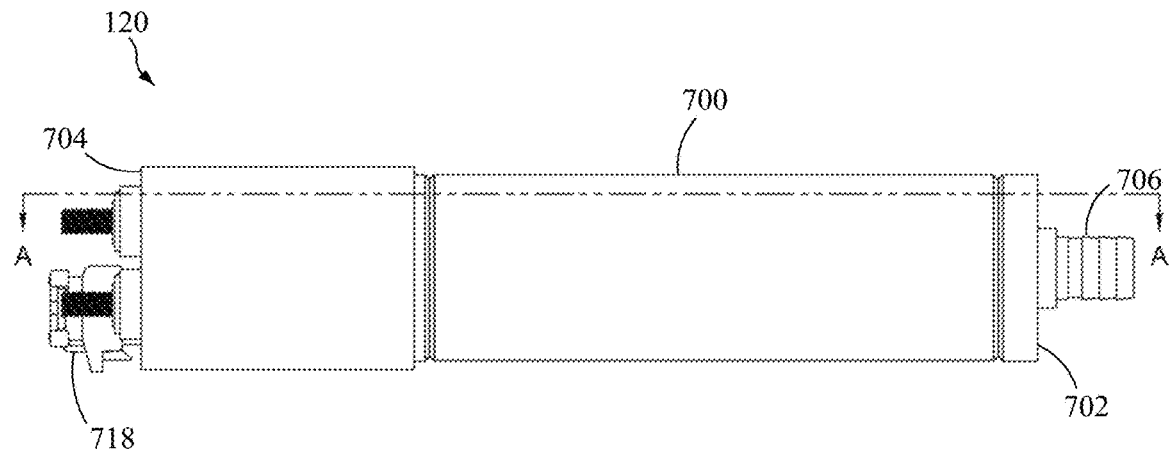
FIG. 7A is a side view of an electric heater manifold.
Figure 7B:
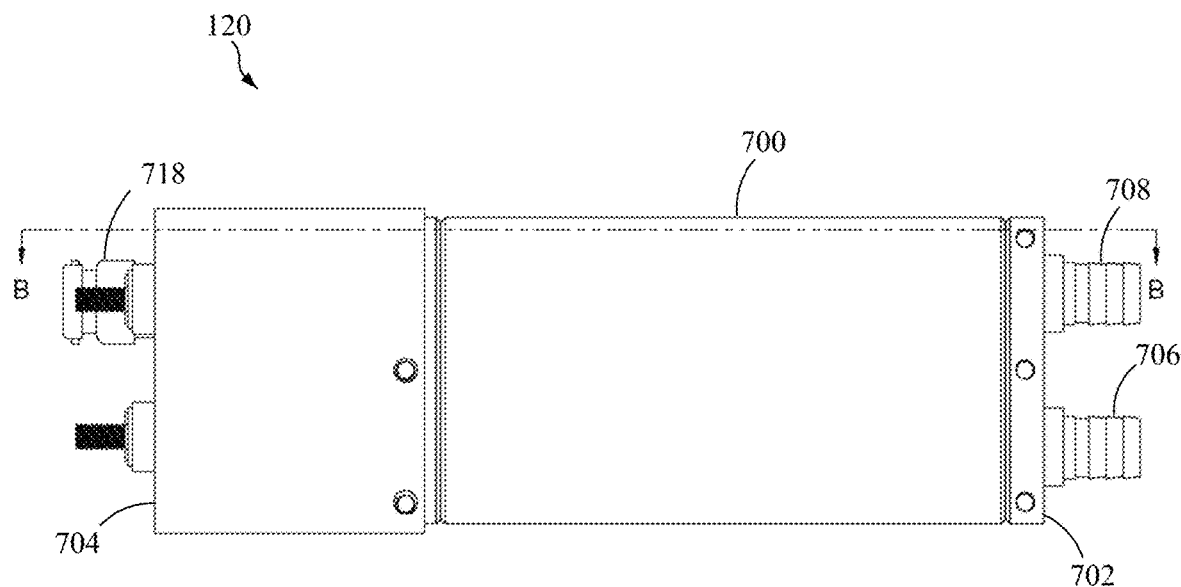
FIG. 7B is a top view of the electric heater manifold.
Figure 7C:
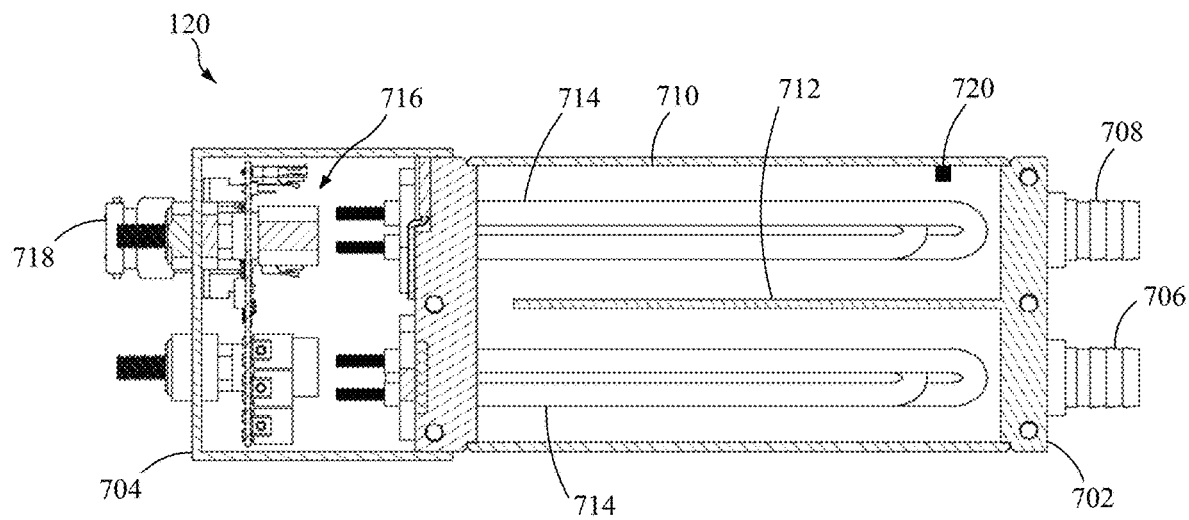
FIG. 7C is a top cross-sectional view of the electric heater manifold from line A-A in FIG. 7A.
Figure 7D:
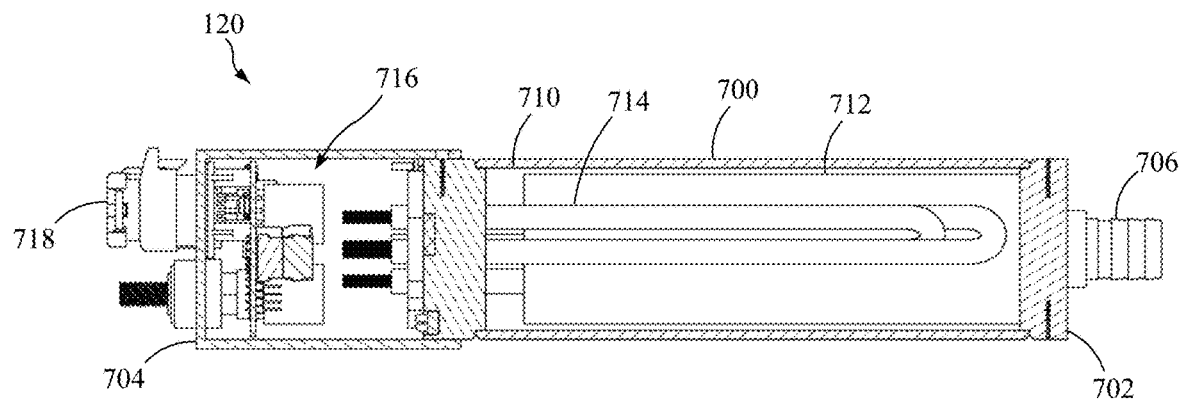
FIG. 7D is a side cross-sectional view of the electric heater manifold from line B-B in FIG. 7B.

FIG. 7A shows a side view of the electric heater manifold 120. FIG. 7B shows a top view of the electric heater manifold 120. FIG. 7C shows a top cross-sectional view of the electric heater manifold 120 from line A-A in FIG. 7A. FIG. 7D shows a side cross-sectional view of the electric heater manifold 120 from line B-B in FIG. 7B. When the engine 102 is running or when the vehicle 200 is in the parked position, the OEM heating system 212 may be used to heat the passenger compartment 202. The electric heater manifold 120 may be powered by the alternate power unit 108 or the 12V vehicle power system to provide heat to the passenger compartment 202. The electric heater manifold 120 may be powered by the alternate power unit 108 when the engine 102 is shut off in the parked position as described herein.

The electric heater manifold 120 can include a housing 700 having a first end 702 opposite a second end 704, an inlet 706, an outlet 708, a liquid channel 710, an internal wall 712, one or more submersible heating elements 714, a heater manifold controller 716, a power inlet 718, and a temperature sensor 720.

In the illustrated, non, limiting example, the housing 700 defines the liquid channel 710 through which liquid coolant can flow. The housing 700 may have a substantially rectangular or any other shape. The inlet 706 and the outlet 708 may be in fluid communication with the liquid channel 710. The housing 700 may include the internal wall 712 inside the housing 700. The internal wall 712 may be coupled to the housing 700 at the first end 702. The internal wall 712 may be disposed in the liquid channel 710 between the inlet 706 and the outlet 708. The housing 700 and the internal wall 712 may define the liquid channel 710. The internal wall 712 may or may not be integral with the housing 700. The configuration of the housing 700, the liquid channel 710, and the internal wall 712 is not limited to the examples described.

The inlet 706 and the outlet 708 may be defined by and/or coupled to the housing 700. The inlet 706 and the outlet 708 may be located on the first end 702. In this configuration, the electric heater manifold 120 can be more easily installed into the engine compartment of a vehicle. Coolant lines coupled to the inlet 706 and the outlet 708 can be routed from the same side of the electric heater manifold 120 to reduce the exterior profile of the electric heater manifold 120 inside the engine compartment. In other embodiments, the inlet 706 and the outlet 708 may be located anywhere on the housing 700 and may or may not be located on the same side of the housing 700.

The one or more submersible heating elements 714 can be coupled to the housing 700 and enclosed inside the liquid channel 710 such that liquid coolant flowing through the liquid channel 710 contacts the one or more submersible heating elements 714. The one or more submersible heating elements 714 may include glow plug heating elements, resistive heating elements, thermal electric couplers, any other suitable heating element, or any combination thereof. The one or more submersible heating elements 714 may be powered by the alternate power unit 108 or any power source. When activated, the one or more submersible heating elements 714 may generate heat to be transferred to the liquid coolant flowing through the liquid channel 710. In embodiments where the electric heater manifold 120 includes more than one submersible heating element 714, the submersible heating elements 714 can be disposed on opposing sides of the internal wall 712.

Cold liquid coolant may enter the liquid channel 710 through the inlet 706. The liquid coolant flowing through the inlet 706 may contact one of the submersible heating elements 714, flow around the internal wall 712, and contact another of the submersible heating elements 714. The submersible heating elements 714 may heat the cold liquid coolant into hot liquid coolant. The hot liquid coolant may exit the liquid channel 710 through the outlet 708.

The heater manifold controller 716 may be in electrical communication with the one or more submersible heating elements 714. The heater manifold controller 716 may control the activation, deactivation, and the heat output by the one or more submersible heating elements 714. The heater manifold controller 716 may be in electrical communication with a temperature sensor 720 configured to measure the temperature of coolant in the liquid channel 710. The temperature sensor 720 can include one or more temperature sensors located anywhere in the liquid channel 710, inlet 706, and/or outlet 708. The heater manifold controller 716 may activate, deactivate, and/or regulate the heat generated by the one or more submersible heating elements 714 in response to a signal received from the temperature sensor 720 indicative of a temperature of the coolant flowing through the liquid channel 710. The temperature sensor 720 may include any suitable sensor.

The heater manifold controller 716 may be coupled to the housing 700 and enclosed inside the housing 700 in a chamber separate from the liquid channel 710. The heater manifold controller 716 may be in electrical communication with the HVAC controller 208 or any other described controller. The heater manifold controller 716 and/or the submersible heating elements 714 may receive power from the alternate power unit 108 or any other described power source via the power inlet 718.

Referring again to FIG. 3, the electric heater manifold 120 may be plumbed in-line with a radiator coolant hose 313. The electric heater manifold 120 may be in fluid communication with an electric coolant pump 332 and a solenoid valve 334. The solenoid valve 334 may include a diverting 3-way solenoid valve or any other solenoid valve. The electric coolant pump 332 may include any suitable pump and may pump coolant heated by the electric heater manifold 120 through the heater core of the OEM heating system 212. The solenoid valve 334 may be closed to divert the coolant away from the radiator 312 and/or engine block such that the coolant flows between the heater core and the electric heater manifold 120. This configuration maintains heated coolant within the OEM heating system 212 with which to heat the passenger compartment 202.

The heater manifold controller 716 may be in electrical communication with a shut-off switch configured to activate and/or deactivate the submersible heating elements 714. The shut-off switch may also be configured to open and close the solenoid valve 334. The heater manifold controller 716 can use the shut-off switch to deactivate the submersible heating elements 714 and/or close the solenoid valve 334 when current supplied to the submersible heating elements 714 is above a threshold or when a temperature of the submersible heating elements 714 and/or liquid coolant is above a threshold. The shut-off switch can therefore prevent overheating and/or short-circuit conditions within the electric heater manifold 120.

Figure 8:
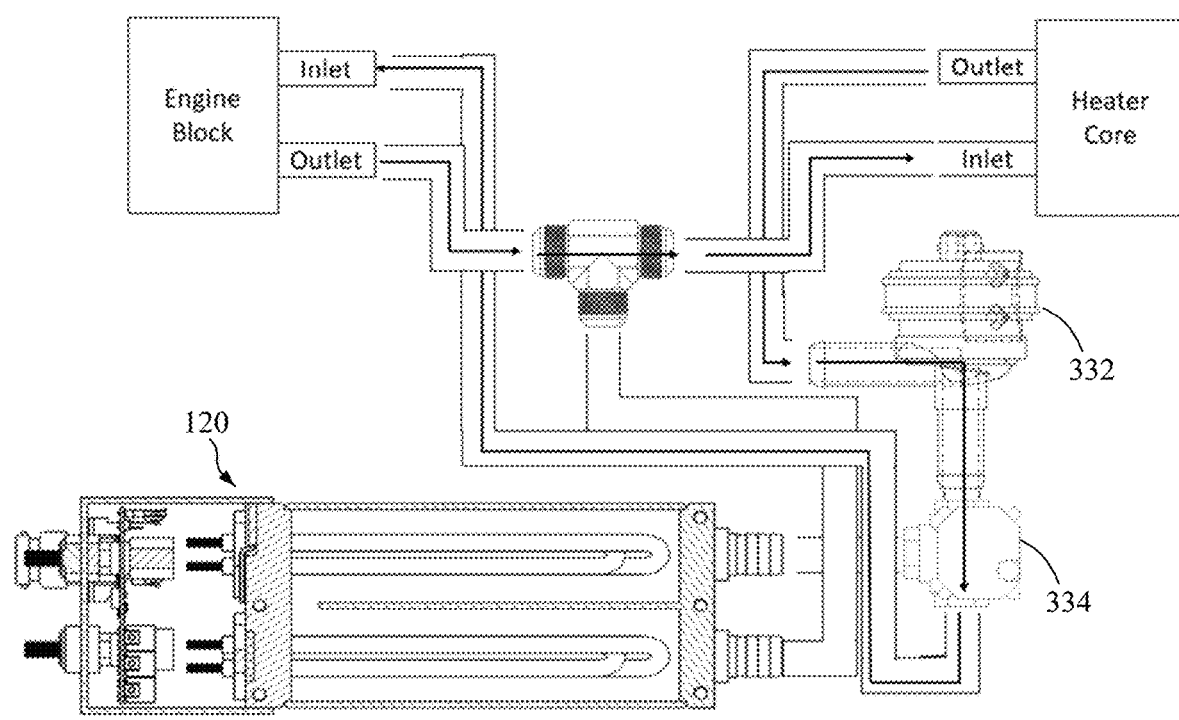
FIG. 8 is a diagram of the electric heater manifold in operation with an electric coolant pump and a solenoid valve in an open position.

FIG. 8 shows the electric heater manifold 120 in operation with the electric coolant pump 332 and the solenoid valve 334 in an open position. When the engine 102 of the vehicle 200 is turned off and engine coolant temperature is above a first threshold (e.g. 185° F.), the electric coolant pump 332 may pump the coolant from the engine block, through the open solenoid valve 334, to the heater core of the OEM heating system 212, and back to the engine block. Coolant flow is illustrated using arrows. While the temperature of the engine coolant remains above the first threshold, the submersible heating elements 714 can remain deactivated.

Figure 9:
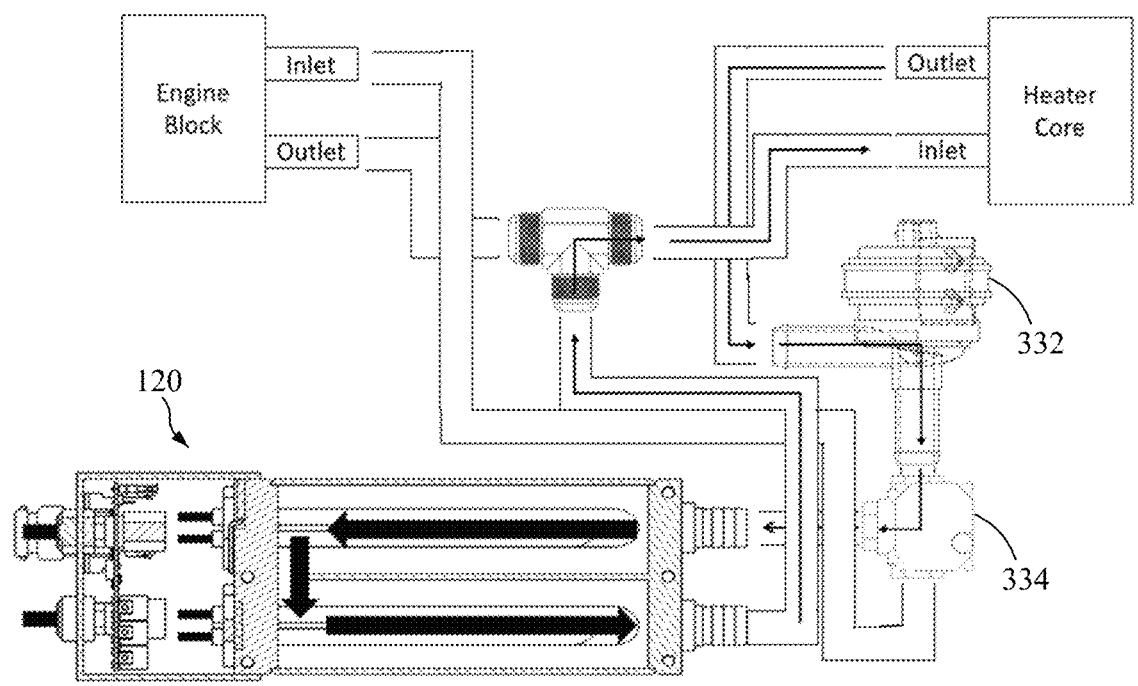
FIG. 9 is a diagram of the electric heater manifold in operation with the electric coolant pump and the solenoid valve in a closed position.

FIG. 9 shows the electric heater manifold 120 in operation with the electric coolant pump 332 and the solenoid valve 334 in a closed position. When the engine coolant temperature is below the first threshold and above a second threshold (e.g. 175° F.), the heater manifold controller 716 or the HVAC controller 208 may close the solenoid valve 334. The electric coolant pump 332 may pump the coolant from the electric heater manifold 120, through the closed solenoid valve 334, to the heater core of the OEM heating system 212, and back to the electric heater manifold 120. Coolant flow is illustrated using arrows. While the temperature of the engine coolant remains above the second threshold, the submersible heating elements 714 can remain deactivated. In this configuration, flow of the heated coolant is limited from flowing into the engine block so as to minimize heat loss. When the coolant temperature is below the second threshold, the heater manifold controller 716 may activate the one or more submersible heating elements 714. If the coolant temperature is above a third threshold (e.g. 165° F.), the heater manifold controller 716 may energize the submersible heating elements 714 at a 50% heating capacity. In other embodiments, the heater manifold controller 716 may energize the submersible heating elements 714 at any heating capacity. When the coolant temperature is below the third threshold, the heater manifold controller 716 may energize the submersible heating elements 714 to an increased heating capacity (e.g. 100%).

As mentioned briefly in regard to FIG. 1, another physical improvement to the vehicle 200 that may be implemented in the vehicle power control system 100 is the starter motor generator unit 122. The starter motor generator unit 122 may be used to charge the rechargeable batteries 500 of the alternate power unit 108. When the rechargeable batteries 500 are sufficiently charged, the starter motor generator unit 122 may apply hybrid electric motive power to assist the engine 102, such as to a crankshaft of the engine 102, so as to assist motive power of the engine 102 and conserve fuel. As such, the starter motor generator unit 122 may be interactively connected to the alternate power unit 108 through the isolated or non-isolated bidirectional power converter 104 such as being monitored and controlled by the HVAC controller 208 and ECU 206, either charging the rechargeable batteries 500 or returning hybrid electric power to the crankshaft.

Figure 10:
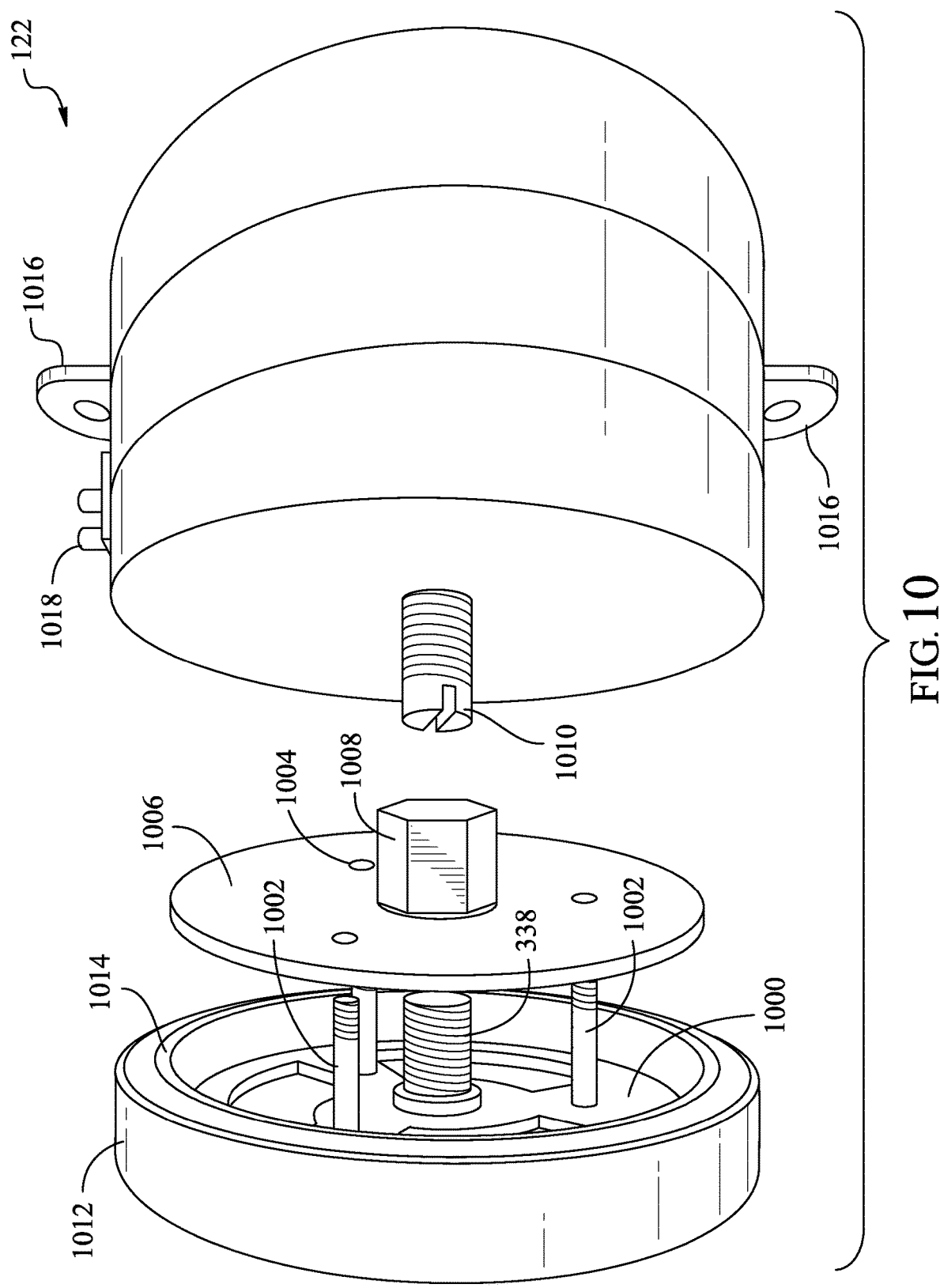
FIG. 10 is an exploded view of a starter motor generator unit.
Figure 11:
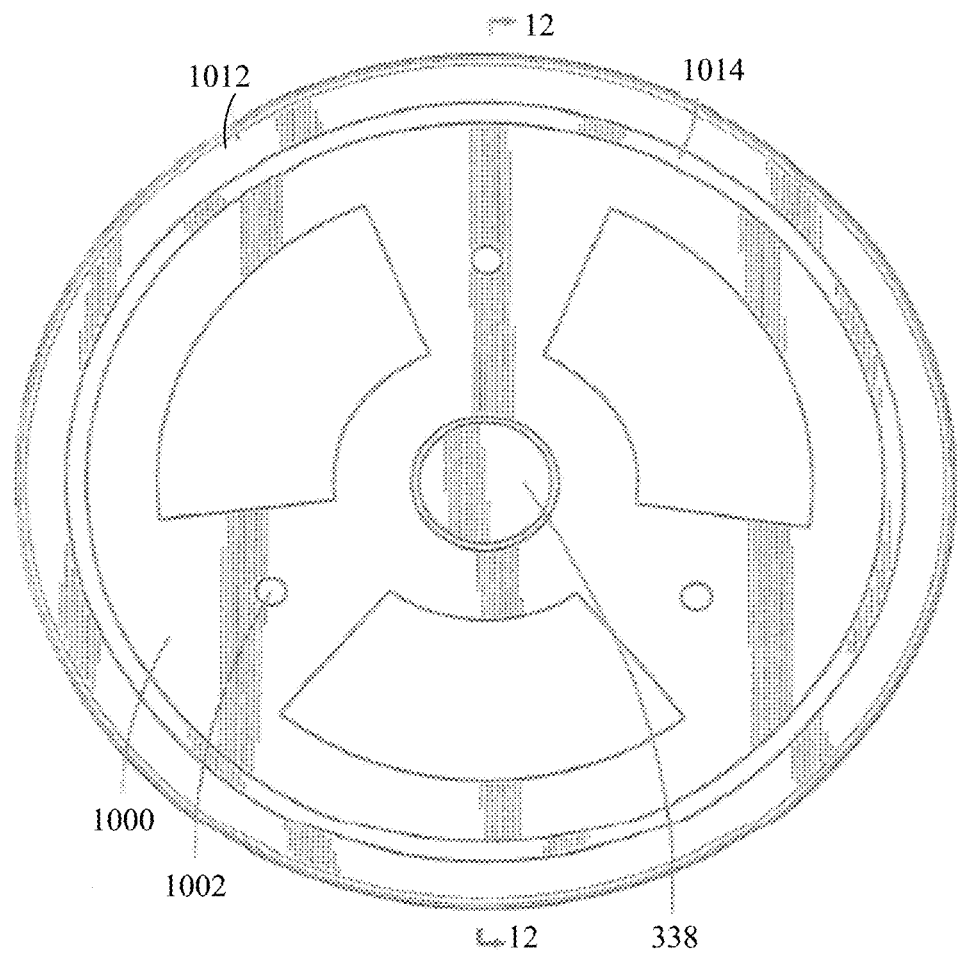
FIG. 11 is a plan view of a harmonic balancer which is an attachment location for the starter motor generator unit of FIG. 10.
Figure 12:
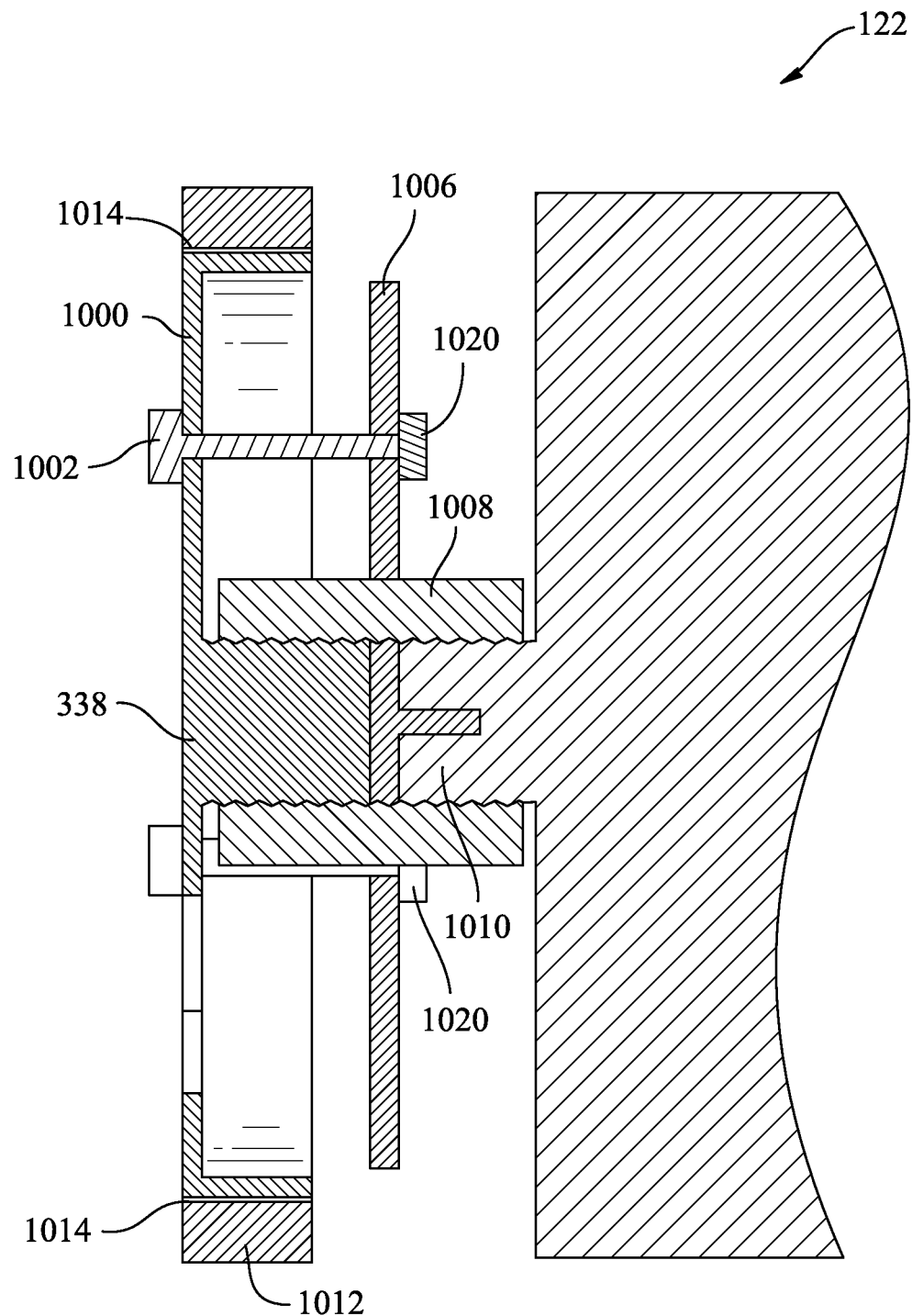
FIG. 12 is a cross-sectional view of the starter motor generator unit of FIG. 10 taken along line 12-12 in FIG. 11.

Further details of the starter motor generator unit 122 are shown in FIGS. 10-12. As can be seen by the exploded view of FIG. 10, the starter motor generator unit 122 is operably coupled to the crankshaft, such as through a crankshaft pulley 336, or through the serpentine or drive belt 300, which may also be connected to the alternator 116 (see FIG. 3). Rotation of the drive belt 300 by the engine 102 can activate the starter motor generator unit 122 that may be used as a generator to create electricity for charging the rechargeable batteries 500 or other electrical accessories of the vehicle, as needed.

With initial reference to FIG. 10, the coupling of the starter motor generator unit 122 may be made directly to a through-bolt 338 of the crankshaft or the crankshaft pulley 336. An adapter flange 1000 of the starter motor generator unit 122, such as a circular flange, may be attached directly to the crankshaft pulley 336 and if needed to a wall or other attachment point of the engine 102 or other structure in the engine compartment. Bolts 1002 or other fasteners extend through the adapter flange 1000 within the crankshaft pulley 336 at one end thereof, and into apertures 1004 in an adapter plate 1006. A coupler 1008 is arranged on the adapter plate 1006 at an opposite side from the adapter flange 1000. The coupler 1008 is arrange coaxially with the through-bolt 338 and a rotatable shaft 1010 of the starter motor generator unit 122. The rotatable shaft 1010 may be keyed and splined, and the interior surface of the coupler 1008 may be correspondingly sized and shaped for a fitting arrangement that secures the starter motor generator unit 122 to the crankshaft pulley 336 through the adapter flange 1000 and the adapter plate 1006.

An annular harmonic balancer, which may also be referred to as a vibration damper 1012 is associated with the crankshaft pulley 336. As can be seen more clearly in FIGS. 11 and 12, there is a space 1014 between the outer circumference of the adapter flange 1000, which may be generally circular, and the inner diameter surface of the harmonic balancer 1012. As explained above, the rotatable shaft 1010 of the starter motor generator unit 122 is coupled or otherwise attached to the through-bolt 338 of the crankshaft pulley 336 by means of the adapter plate 1006 and the coupler 1008 or other fastener such that rotational energies are imparted between the through-bolt 338 and the rotatable shaft 1010. By these couplings, the adapter flange 1000 does not contact the harmonic balancer 1012.

One end of the starter motor generator unit 122 is supported by the crankshaft pulley 336 using the through-bolt 338. The opposite anterior end of the starter motor generator unit 122 can be supported by one or more brackets 1016 extending from the starter motor generator unit 122 to a structure associated with the engine 102 or disposed adjacent thereto such as within an engine compartment of the vehicle 200. The starter motor generator unit 122 may be mounted to a point on or adjacent to the engine 102 by brackets or other methods of attachment so that it is effectively aligned and coupled with the engine drive belt in order to provide motive force to the vehicle 200.

Another alternative method of coupling a starter motor generator unit to the vehicle 200 may be accomplished by mounting the unit to the OEM starter motor mounting flange either permanently engaged by appropriately-sized gears or having a Bendix mechanism engaged by a solenoid actuator with or without gear reduction attached to the inserted end, by which to engage the engine ring gear. Placement and attachment may be such that the opposite end is effectively aligned and coupled with the engine drive belt in order to provide motive force to the vehicle 200.

Electric contacts or terminals 1018 are operably coupled to the starter motor generator unit 122 for transferring electricity between the starter motor generator unit 122 and the rechargeable batteries 500 of the alternate power unit 108, vehicle accessories or the like. As shown in FIG. 10, the terminals 1018 may be affixed to the housing of the starter motor generator unit 122. Electrical connectors, such as wires or cables, may extend between the terminals 1018 and terminals 1020 engaged at a fixed position on the adapter plate 1006, such as at locations of the bolts 1002 as shown in FIG. 12. Although not shown in detail, one or more slip rings and/or other connectors may be used to allow the rotating components (e.g., the crankshaft pulley 336, and the rotatable shaft 1010 and rotor of the starter motor generator unit 122) to rotate while housings and the adapter flange 1000 and adapter plate 1006 do not rotate.

During a battery charging mode, electricity may be conveyed from the starter motor generator unit 122 to the rechargeable batteries 500 of the alternate power unit 108. Electricity can also be returned to the starter motor generator unit 122, such as from the rechargeable batteries 500 so as to apply motive power to the through-bolt 338 of the crankshaft or the drive belt 300 and thereby provide motive power to the crankshaft so as to conserve energy and make the vehicle more fuel efficient, to provide added power, or both. This allows hybrid drive adaptation to an existing belt and pulley arrangement, such as between the crankshaft pulley 336, the alternator 116, the mechanical air conditioning compressor 302, etc.

The starter motor generator unit 122 (e.g. a high voltage starter motor generator unit) can be employed to smoothly start and assist acceleration by which to supply motive power to the vehicle 200, such as by assisting rotation of the crankshaft or the like.

In addition to the physical improvements and modifications described with respect to the vehicle power control system 100, the vehicle power control system 100 may include inventive controls using the above described modifications, OEM vehicle components, or both.

Figure 13:
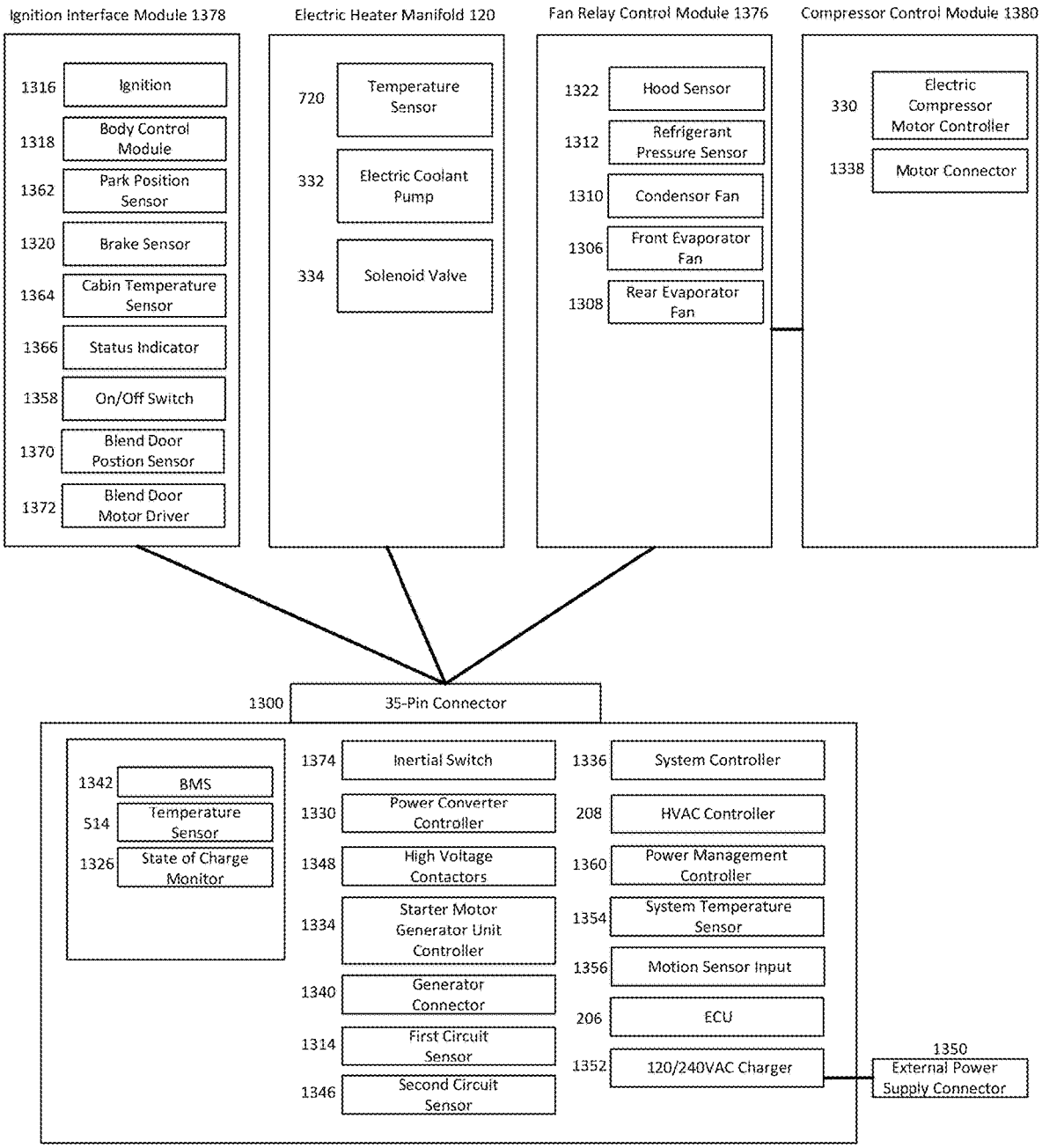
FIG. 13 is a block diagram of components of the vehicle power control system of FIG. 1 in electrical communication with components of the vehicle.

FIG. 13 is a block diagram of components of the vehicle power control system 100 in electrical communication with components of the vehicle 200. Communications between the vehicle power control system 100 and the components of the vehicle 200 may be routed through a connector 1300. In FIG. 13, a 35-pin connector is used by example.

The vehicle power control system 100 may have communications and telemetric capabilities so as to interactively communicate with the ECU 206 through an automotive CANbus of the vehicle 200. As described briefly in regard to FIG. 3, the variable displacement valve 310 may be used when operating the mechanical air conditioning compressor 302 under control of the OEM HVAC controller. The OEM HVAC controller may utilize pulse-width modulated (PWM) or other signals to turn on and turn off a front evaporator fan 1306 and/or a rear evaporator fan 1308. Control of the front evaporator fan 1306 and the rear evaporator fan 1308 may correspond to a front evaporator fan relay and a rear evaporator fan relay. The fans 1306, 1308 may provide multiple operating loads (e.g., due to multiple speeds) based on climatic conditions and/or operator demand. Similarly, the OEM HVAC controller may utilize PWM or other signals to turn on and turn off a condenser fan 1310. The condenser fan 1310 may be controlled based on signals received from a refrigerant pressure sensor 1312. The refrigerant pressure sensor 1312 may measure a pressure in a refrigerant line of the vehicle 200. In the example of FIG. 13, the refrigerant pressure sensor 1312 is a high-side sensor that measures the refrigerant pressure at a high-pressure refrigerant line, such as the refrigerant line 314. A higher pressure measured by the refrigerant pressure sensor 1312 may result in higher fan speed of the condenser fan 1310.

The starter battery 106 described above may be monitored by one or more sensors. In FIG. 13, a voltage of the starter battery 106 is measured by a 12V sense circuit. The 12V sense circuit is one example of a first voltage or first circuit sensor 1314 whose output signals are available to the vehicle power control system 100. For example, the vehicle power control system 100 may receive signals from the first circuit sensor 1314 that can measure voltage at the first circuit or at any component in electrical communication with the first circuit (e.g., the starter battery 106). Analog voltage data from the first circuit sensor 1314 may be scaled to a 0 to 5.0 VDC signal. The scaled 0 to 5.0 VDC signal may be processed as the first voltage for control by the vehicle power control system 100. For example, the scaled 0 to 5.0 VDC signal may be used to establish safety parameters including a first voltage range. If the first voltage is outside of the first voltage range, operation of one or more components of the vehicle power control system 100 may be stopped.

Other inputs to the vehicle power control system 100 may include signals from the following vehicle components: an ignition 1316, a body control module 1318, a brake sensor 1320, and a hood sensor 1322 configured to detect a position of a vehicle hood. A fuse panel may be incorporated into the vehicle 200. The fuse panel may include fuses that protect any or all of the control electronics of the vehicle components, such as the sensors and modules, from the mechanical components, such as the fans, battery, and compressor, protect the mechanical components from the control electronics, protect the vehicle components from the vehicle power control system 100, and protect the vehicle power control system 100 from the vehicle components.

The vehicle power control system 100 includes one or more connectors, sensors, controllers, relays, etc., associated with the physical vehicle improvements discussed previously. These components may be mounted on a single printed circuit board (PCB), or may be mounted on several PCBs. For example, a first ignition relay may correspond to ignition accessory controls in the ECU 206, and second and third ignition relays may correspond to ignition run controls in the ECU 206.

The vehicle power control system 100 includes one or more controllers that together or separately can send and receive signals, execute algorithms to determine climate control conditions and requirements, and operate climate control of the vehicle 200 for prolonged periods when the engine 102 is running, when the engine 102 is not running, or both. These controllers may be processors, microprocessors, sub-processors, integrated circuits, or the like. Each may be configured to execute instructions stored in a memory, for example. The controllers may include, as shown in FIG. 13, the HVAC controller 208, a system controller 1336, the bidirectional power converter controller 1330, and the electric compressor motor controller 330. The controllers may also include a starter motor generator unit controller 1334, and a power management controller 1360. One or more of the described controllers may be implemented in the system controller 1336. The controllers may be in electrical communication with one or more sensors or other components described herein and each other through I/O pins, digital or analog connectors, buses, such as serial I/O buses, or any combination of these devices.

The HVAC controller 208 controls operation of the electric air conditioning compressor 118, a motor of the electric air conditioning compressor (also called an electric air conditioning compressor motor), the electric heater manifold 120, and the electric coolant pump 332. The HVAC controller 208 may also receive and process signals from sensors that measure operating conditions of the electric air conditioning compressor 118 and the electric heater manifold 120. Operating conditions may include but are not limited to power and/or voltage received from any power source, on or off status, and/or temperature output to the passenger compartment 202. For example, the HVAC controller 208 may be in electrical communication with the OEM HVAC controller, the refrigerant pressure sensor 1312, and other sensors 204.

The HVAC controller 208 may be in electrical communication with the electric compressor motor controller 330 to control the operation of the electric air conditioning compressor motor. As seen in FIG. 13, the motor for the electric air conditioning compressor 118 may be electrically coupled to the electric compressor motor controller 330 through a motor connector 1338. In an example, the motor is a 3 kW AC motor. The motor connector 1338 may be coupled to one or more relays to turn the motor on and off. In some implementations, the HVAC controller 208 may use an electric compressor motor relay to turn on or turn off the electric air conditioning compressor motor when the OEM cooling system 210 is actuated, instead of the mechanical air conditioning compressor 302. In the illustrated, non-limiting example shown in FIG. 13, the electric compressor motor controller 330 and the motor connector 1338 may be included in a compressor control module 1380.

In some embodiments, the HVAC controller 208 may include the electric compressor motor controller 330. Further, the HVAC controller 208 is shown as a single controller by example only. The HVAC controller 208, like the other controllers herein, may be formed of several controllers or processors that coordinate operations. For example, the HVAC controller 208 may include a central processing unit, an evaporator processing unit, and a condenser processing unit that together may read and replicate signals generated by the OEM HVAC controller so as to control the mechanical air conditioning compressor 302 and/or the electrical air conditioning compressor 118, the front evaporator fan 1306, the rear evaporator fan 1308, the condenser fan 1310, and the blower 214. In the illustrated, non-limiting example shown in FIG. 13, the hood sensor 1322, the refrigerant pressure sensor 1312, the condenser fan 1310, the front evaporator fan 1306, and the rear evaporator fan 1308 may be included in a fan relay control module 1376.

The HVAC controller 208 may be in communication with the power management controller 1360. In this description, the power management controller 1360 provides central control of the vehicle power control system 100 and may be referred to as the system controller 1336. That is, the power management controller 1360 controls the power supplied at any voltage to or from any described power source or component including but not limited to the alternator 116, the starter battery 106, the alternate power unit 108, the electric air conditioning compressor 118, the electric heater manifold 120, the starter motor generator unit 122, the magnetorheological dampers 124 and/or the electric coolant pump 332, based on inputs indicating the status of the components. In other examples one or more different controllers may perform the functions of the system controller described herein.

The bidirectional power converter controller 1330 controls operation of the bidirectional power converter 104, including but not limited to activating the bidirectional power converter 104, deactivating the bidirectional power converter 104. The bidirectional power converter controller 1330 may control the bidirectional power converter 104 to convert voltage from any described power source including but not limited to the alternator 116, the starter battery 106, and/or the alternate power unit 108 to a voltage suitable to supply power to any described component including but not limited to the starter battery 106, the alternate power unit 108, the electric air conditioning compressor 118, the electric heater manifold 120, and/or the electric coolant pump 332. The bidirectional power converter controller 1330 may measure the voltage associated with the first circuit and the second circuit on a periodic basis, such as every 1 millisecond or 1 microsecond, so as to maintain the voltage ratio between the first voltage and the second voltage. The bidirectional power converter controller 1330 can continuously monitor current going through the first circuit and the second circuit using an I/O pin, either digital or analog input, or bus. This current may also be used to report system conversion efficiency through an I/O pin or bus, which may be used to optimize loads for higher efficiency. The bidirectional power converter controller 1330 may be under the control of the system controller 1336.

In implementations where the starter motor generator unit 122 is used, the starter motor generator unit controller 1334 may be under control of the system controller 1336 to control the operation of the starter motor generator unit 122. As seen in FIG. 13, the generator of the starter motor generator unit 122 may be electrically coupled to the starter motor generator unit controller 1334 through a generator connector 1340. In an example, the generator is a 3 kW DC generator. The generator connector 1340 may be coupled to one or more relays to turn the generator on and off.

In implementations where the alternate power unit 108 is used, controls and monitoring for the rechargeable batteries 500 of the alternate power unit 108 may be included in the vehicle power control system 100. For example, a battery management system 1342 can be in electrical communication with the system controller 1336. The battery management system 1342 may control the charge and discharge of the alternate power unit 108. As described, the one or more temperature sensors 514 may be mounted within the alternate power unit 108 so as to monitor temperatures of the rechargeable batteries 500. This signal may be used to set safety parameters, such that system operation ceases in the event of where the temperature exceeds a high temperature limit or falls below a low temperature limit.

A voltage of the alternate power unit 108 is measured by a 48V sense circuit because the alternate power unit 108 is in the high-voltage, second circuit in this example. The 48V sense circuit is one example of a second circuit sensor 1346. The second circuit sensor 1346 can measure voltage at the second circuit or at any component in electrical communication with the second circuit so as to provide output signals for operation of the vehicle power control system 100. Analog voltage data from second circuit sensor 1346 may be scaled to a 0 to 5.0 VDC signal. The scaled 0 to 5.0 VDC signal may be processed as the second voltage associated with the second circuit for control by the vehicle power control system 100. For example, the scaled 0 to 5.0 VDC signal may be used to establish safety parameters including a second voltage range. If the second voltage is outside of the second voltage range, operation of one or more components of the vehicle power control system 100 may be stopped. The first voltage range may or may not equal the second voltage range described above with regards to the first circuit sensor 1314.

When the alternate power unit 108 is at a high voltage (e.g., in the second circuit as opposed to the first circuit), high voltage direct current from the alternate power unit 108 may be transferred through high voltage contactors 1348 to, e.g., the bidirectional power converter 104.

In some embodiments where the vehicle includes the alternate power unit 108, the vehicle power control system 100 includes an external power supply connector 1350. The external power supply connector 1350 may include a 120/240 VAC connector that is capable of supplying power to a 120/240 VAC battery charger 1352. The 120/240 VAC battery charger 1352 can be used to charge the alternate power unit 108. For example, the 120/240 VAC battery charger 1352 may charge the alternate power unit 108 while the vehicle 200 is parked, such as during overnight parking.

As shown in FIG. 13, the vehicle power control system 100 may include an input for another temperature sensor. The system temperature sensor 1354 may be a digital thermometer that is mounted on the PCB supporting the controllers of the vehicle power control system 100 to monitor the controllers and other electronics of the vehicle power control system 100 for, e.g., high, temperatures. One or more components of the vehicle power control system 100 may shut down or otherwise stop operating responsive to the system temperature being out of a defined temperature range.

The vehicle power control system 100 may also include a motion sensor input 1356 for a motion sensor that is placed within the passenger compartment 202 (e.g., as one of the sensors 204). The motion sensor may include one or more PIR motion sensors or any other type of motion sensor. Signals received at the motion sensor input 1356 from the motion sensor responsive to detecting passenger motion within the passenger compartment 202 may engage or activate the vehicle power control system 100. Additionally, or alternatively, the system controller 1336 may receive the signals and instruct the HVAC controller 208 to activate the electric air conditioning compressor 118 or the electric heater manifold 120 in response to the detected motion when the engine 102 is idling or off.

The vehicle power control system 100 shown in FIG. 13 includes an optional system on/off switch 1358. The system on/off switch 1358 is adapted to be engaged by the user to selectively start and stop the vehicle power control system 100. The system on/off switch 1358 may include a button, switch, touch screen selection, physical gesture, voice command, or the like. The system on/off switch 1358 may be connected to the vehicle 200 in a location inside the passenger compartment 202, or may be remotely activated, such as by a key fob through wireless communications. The system on/off switch 1358 may send a signal to activate or deactivate the vehicle power control system 100 if the system on/off switch 1358 is engaged for longer than a defined time period. In an example, the defined time period is 200 ms.

FIGS. 14-17 are block diagrams of the vehicle power control system 100 of FIG. 1 in different arrangements with components of a vehicle, such as the vehicle 200. These are simplified block diagrams that omit the control elements of the vehicle power control system 100 shown in FIG. 13, and can be used to explain in more detail the operations of the vehicle power control system 100.

With regard to each of FIGS. 14-17, the system controller 1336 controls bidirectional voltage conversion between a first circuit 1400 and a second circuit 1402, thermal management of described components, activation and deactivation of the vehicle power control system 100, voltage, current, and/or charge monitoring of described components.

For example, the system controller 1336 may, in response to receiving a signal indicative of an energy demand at the first circuit 1400, convert energy using the bidirectional power converter 104 from the second voltage associated with the second circuit 1402 to the first voltage associated with the first circuit 1400. Similarly, the system controller 1336 may, in response to receiving a signal indicative of an energy demand at the second circuit 1402, convert energy from the first voltage associated with the first circuit 1400 to the second voltage associated with the second circuit 1402.

The system controller 1336 may receive a signal indicative of an energy demand at the first circuit 1400 or the second circuit 1402 from one or more energy demand sensors adapted to measure a value indicative of energy demand at the first circuit 1400 or the second circuit 1402. The vehicle power control system 100 may include one or more energy demand sensors adapted to measure values indicative of energy demand, including but not limited to current, voltage, resistance, temperature, battery charge, and/or any other suitable value. The one or more energy demand sensors may include temperature sensors, shunts, Hall-effect current sensors, voltage sensors, or any other sensor type, such as the sensors described in regard to FIG. 13. The energy demand at the first circuit 1400 is created in response to electrical components in electrical communication with the first circuit 1400 requiring power. The energy demand at the second circuit 1402 may be created in response to electrical components in electrical communication with the second circuit 1402 requiring power. Sensors may directly measure energy demand at the first circuit 1400 or the second circuit 1402. Sensors may measure energy demand of one or more electrical components in electrical communication with the first circuit 1400 or the second circuit 1402.

The system controller 1336 may also, in response to a determination that the first circuit 1400 or the second circuit 1402 has no energy demand, control the bidirectional power converter 104 to stop conversion of energy between the first circuit 1400 and the second circuit 1402. The system controller 1336 may determine that the first circuit 1400, the second circuit 1402, or both have no energy demand based on receiving a signal from the energy demand sensors. In some embodiments, the system controller 1336 may determine that the first circuit 1400 has no energy demand in response to receiving signals from one or more sensors indicating that the first voltage is above a first maximum voltage. The system controller 1336 may determine that the second circuit 250 has no energy demand in response to receiving signals from the one or more sensors indicating that the second voltage is above a second maximum voltage. The first maximum voltage and the second maximum voltage may be any voltage and may or may not be equal.

Other sensed conditions may stop conversion of energy between the first circuit 1400 and the second circuit 1402. For example, the system controller 1336 may stop conversion of energy between the first circuit 1400 and the second circuit 1402 if the first voltage is not within a first voltage range, the second voltage is not within a second voltage range, or both the first voltage is not within a first voltage range and the second voltage is not within a second voltage range. The system controller 1336 may stop conversion of energy between the first circuit 1400 and the second circuit 1402 if a first current associated with the first circuit 1400 is not within a first current range, a second current associated with the second circuit 1402 is not within a second current range, or a first current associated with the first circuit 1400 is not within a first current range and a second current associated with the second circuit 1402 is not within a second current range. The first voltage and the second voltage may be measured by the one or more voltage sensors at the first circuit 1400, the second circuit 1402, or at any of the electrical components in electrical communication with the first circuit 1400 or the second circuit 1402.

The system controller 1336 may stop conversion of voltage by externally isolating the bidirectional power converter 104 from the first circuit 1400 and the second circuit 1402. For example, the system controller 1336 may externally isolate the bidirectional power converter 104 by switching open the MOSFETs or contactors of the bidirectional power converter 104 with which to de-energize or 'turn off' the connection between the first circuit 1400 and the second circuit 1402. This may prevent depletion of the starter battery 106 and/or the alternate power unit 108 when the vehicle power control system 100 and/or the bidirectional power converter 104 is not in use.

After conversion of energy between the first circuit 1400 and the second circuit 1402 is stopped, the system controller 1336 may restart energy conversion based on one or more criteria. Such criteria may include one or more of receiving a signal from voltage sensors indicating that the first voltage and the second voltage are within the respective first and second voltage ranges, receiving an override signal to restart energy conversion, receiving a signal to restart the engine 102, or receiving a signal indicating that the engine 102 is running. The system controller 1336 may receive the signal indicating that the engine 102 is running from a sensor or tachometer adapted to measure the rotation of a vehicle crankshaft or other mechanical component of the vehicle 200, from a sensor adapted to measure output of the alternator 116, from the ECU 206 via the CANbus, from a sensor adapted to measure fuel flow, or from any other suitable sensor.

An electrical component in electrical communication with the first circuit 1400 may include the alternator 116, the starter battery 106, the alternate power unit 108, the electric air conditioning compressor 118, the electric heater manifold 120, and/or the electric coolant pump 332. An electrical component in electrical communication with the second circuit 1402 may include the alternator 116, the starter battery 106, the alternate power unit 108, the electric air conditioning compressor 118, the electric heater manifold 120, the electric coolant pump 332, the starter motor generator unit 122, and/or magnetorheological damper 124. The electrical components in electrical communication with the first circuit 1400 may operate at a voltage of 5-30 volts. In some embodiments, the electrical components in electrical communication with the first circuit 1400 may operate at a voltage of 12 volts. The electrical components in electrical communication with the second circuit 1402 may operate at a voltage of 20-100 volts. In some embodiments, the electrical components in electrical communication with the second circuit 1402 may operate at a voltage of 48 volts.

Figure 14:
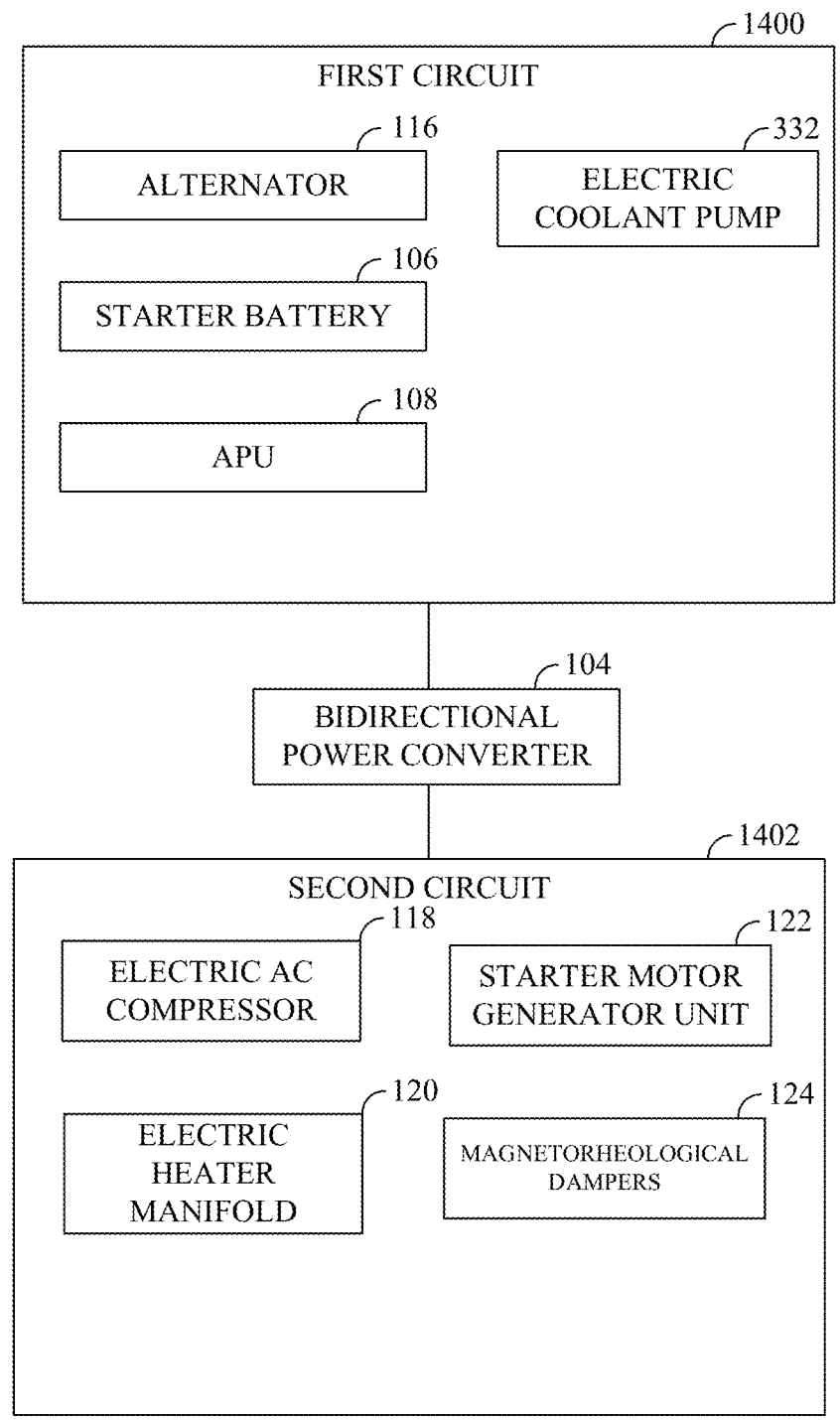
FIG. 14 is a block diagram of the vehicle power control system of FIG. 1 in a first arrangement with components of the vehicle.

In FIG. 14, a first arrangement is shown where the alternator 116, the starter battery 106, the electric coolant pump 332, and the alternate power unit 108 are in electrical communication with the first circuit 1400. The electric air conditioning compressor 118, the electric heater manifold 120, the starter motor generator unit 122, and the magnetorheological dampers 124 are in electrical communication with the second circuit 1402. It should be noted that the starter motor generator unit 122 and the magnetorheological dampers 124 may not be included in the vehicle power control system 100 and may not be in electrical communication with the second circuit 1402. The first circuit 1400 and the second circuit 1402 are connected through the bidirectional power converter 104.

In the illustrated example, the system controller 1336 can control charging of the alternate power unit 108 while the engine 102 is running. A battery management system 1342 can determine a state of charge of the alternate power unit 108. In one example, a state of charge monitor 1326 including any suitable sensor (e.g. current sensor or voltage sensor) may measure the state of charge of the alternate power unit 108 and send a signal indicative of the state of charge to the battery management system 1342. The battery management system 1342 may include one or more controllers. The battery management system 1342 communicates a signal to the system controller 1336 indicating the state of charge. The system controller 1336 may compare the state of charge to a minimum charge. If the state of charge of the alternate power unit 108 is below the minimum charge, the system controller 1336 supplies energy from the alternator 116 to the alternate power unit 108. The energy received by the alternate power unit 108 is a difference between the output of the alternator 116 and the electric demand of the vehicle 200. By charging the alternate power unit 108 using excess energy output by the alternator 116, the vehicle power control system 100 does not require plug-in charging or modifications to an existing alternator to charge the alternate power unit 108.

In response to receiving a signal indicative of an energy demand of the electric air conditioning compressor 118, the system controller 1336 may use the bidirectional power converter 104 to convert energy from the alternate power unit 108 at the first voltage to the second voltage and supply the energy to the electric air conditioning compressor 118 at the second voltage. The signal indicative of an energy demand of the electric air conditioning compressor 118 may be generated by the HVAC controller 208 in response to a vehicle occupant turning on the OEM cooling system 210 or in response to signals received from temperature sensors in the passenger compartment 202.

In response to receiving the signal to activate the electric air conditioning compressor 118, the system controller 1336 may communicate a request for a signal from the battery management system 1342 indicative of the state of charge of the alternate power unit 108. Alternatively, the signal may be transmitted without a request, either periodically or otherwise. The system controller 1336 compares the state of charge to a minimum charge. If the state of charge of the alternate power unit 108 is above the minimum charge, the system controller 1336 converts energy from the alternate power unit 108 at the first voltage to the second voltage using the bidirectional power converter 104 and supplies the energy to the electric air conditioning compressor 118. The electric air conditioning compressor 118 functions with the OEM cooling system 210 to cool the passenger compartment 202.

More specifically, and as mentioned briefly above in regard to FIG. 3, the OEM HVAC controller may control the variable displacement valve 310 of the mechanical air conditioning compressor 302 while the engine 102 is running. The HVAC controller 208 may control the variable displacement valve 310 of the mechanical air conditioning compressor 302 while the engine 102 is not running in conjunction with operation of the electric air conditioning compressor 118. The variable displacement valve 310 continuously adjusts for various sensor inputs to adjust the valve orifice in the variable displacement valve 310 to optimize refrigerant compression requirements and improve energy efficiency. The sensor inputs may include engine crankshaft speed, engine temperature, ambient air temperature, cabin air temperature, system operating temperature, high-side refrigerant pressure, clutch-state, and nominal system voltage.

The HVAC controller 208 may control the variable displacement valve 310 by generating a first channel variable displacement valve output and a second channel variable displacement valve output. A first voltage regulator may energize a variable displacement valve high relay coil that generates the first channel variable displacement valve output. A second voltage regulator may energize a variable displacement valve low relay coil that generates the second channel variable displacement valve output. The first and second voltage regulators allow control of the variable displacement valve 310 within its normal operating range. For example, the first channel variable displacement valve output may latch a voltage of approximately 3.3V DC to the variable displacement valve 310. The second channel variable displacement valve output may latch a voltage of approximately 4.2V DC to the variable displacement valve 310. The first and second channel variable displacement valve outputs may be other voltages, and may be adjusted depending upon environmental factors. Alternately, a PWM-based scaling power supply may be used to regulate VDV position. By controlling the variable displacement valve 310, displacement of the electric air conditioning compressor 118 or the mechanical air conditioning compressor 302 may be controlled to create multiple operating loads based on climate and/or operator demand while the engine 102 is running or not running.

The HVAC controller 208 may control the front evaporator fan 1306 and the rear evaporator fan 1308. The HVAC controller 208 may send PWM signals to turn on and turn off the fans 1306, 1308. A duty cycle of the PWM signal may be used to set the fan speed to create multiple operating loads based on climatic conditions and/or operator demand.

The refrigerant pressure sensor 1312 may be used to measure refrigerant pressure and send a signal indicative of the refrigerant pressure to a condenser fan controller. The condenser fan controller can be used, based on threshold settings, to measure and control operation of the condenser fan 1310. The HVAC controller 208 may control the condenser fan 1310 based on signals received from the refrigerant pressure sensor 1312. The HVAC controller 208 may send a PWM signal to turn on and turn off the condenser fan 1310. A duty cycle of the PWM signal may be varied to control the speed of the condenser fan 1310. Higher pressure measured by the refrigerant pressure sensor 1312 results in higher fan speed of the condenser fan 1310.

The HVAC controller 208 may be in electrical communication with the electric compressor motor controller 330 to control the operation of the electric air conditioning compressor motor. The HVAC controller 208 may be in electrical communication with the OEM HVAC controller, the refrigerant pressure sensor 1312, the sensors 204 adapted to detect conditions in the passenger compartment 202, or any other sensor directly or through the ECU 206, the system controller 1336, or both.

The vehicle power control system 100 may power the electric heater manifold 120 and/or the electric coolant pump 332 in a similar manner described with respect to the electric air conditioning compressor 118. The signal indicative of an energy demand of the electric heater manifold 120 may be generated by the HVAC controller 208 in response to the user turning on the OEM heating system 212. The electric heater manifold 120 functions with the OEM heating system 212 to warm the passenger compartment 202. The vehicle power control system 100 may include both the electric air conditioning compressor 118 and the electric heater manifold 120 as shown, only the electric air conditioning compressor 118, or only the electric heater manifold 120.

The system controller 1336 supplies energy from the alternate power unit 108 to the starter battery 106 in response to receiving a signal indicative of an energy demand of the starter battery 106. The system controller 1336 charges the starter battery 106 using the alternate power unit 108 when the starter battery 106 requires charging or current support. A voltage sensor can measure a value indicative of charge of the starter battery 106 in electrical communication with the first circuit 1400. A signal transmitted from the sensor to the system controller 1336 indicates the measured value. The system controller 1336 determines the state of charge of the starter battery 106 based on the measured value and compares the state of charge to a minimum charge.

If the state of charge of the starter battery 106 is below the minimum charge, the system controller 1336 sends a request for a signal from the battery management system 1342 that determines the state of charge of the alternate power unit 108. Alternatively, the signal may be transmitted without a request, either periodically or otherwise. In either case, the system controller 1336 receives a signal from the battery management system 1342 that indicates the state of charge of the alternate power unit 108. If the state of charge of the alternate power unit 108 is above a minimum charge, the system controller 1336 supplies energy from the alternate power unit 108 to the starter battery 106. By supplying energy from the alternate power unit 108 to the starter battery 106, the vehicle power control system 100 balances the load on the first circuit 1400 by providing supportive current from the alternate power unit 108 to the starter battery 106. This process may reduce demand on the first circuit 1400 by reducing amperage spikes, which may lead to prolonging the life of vehicle components in electrical communication with the first circuit 1400.

Figure 15:
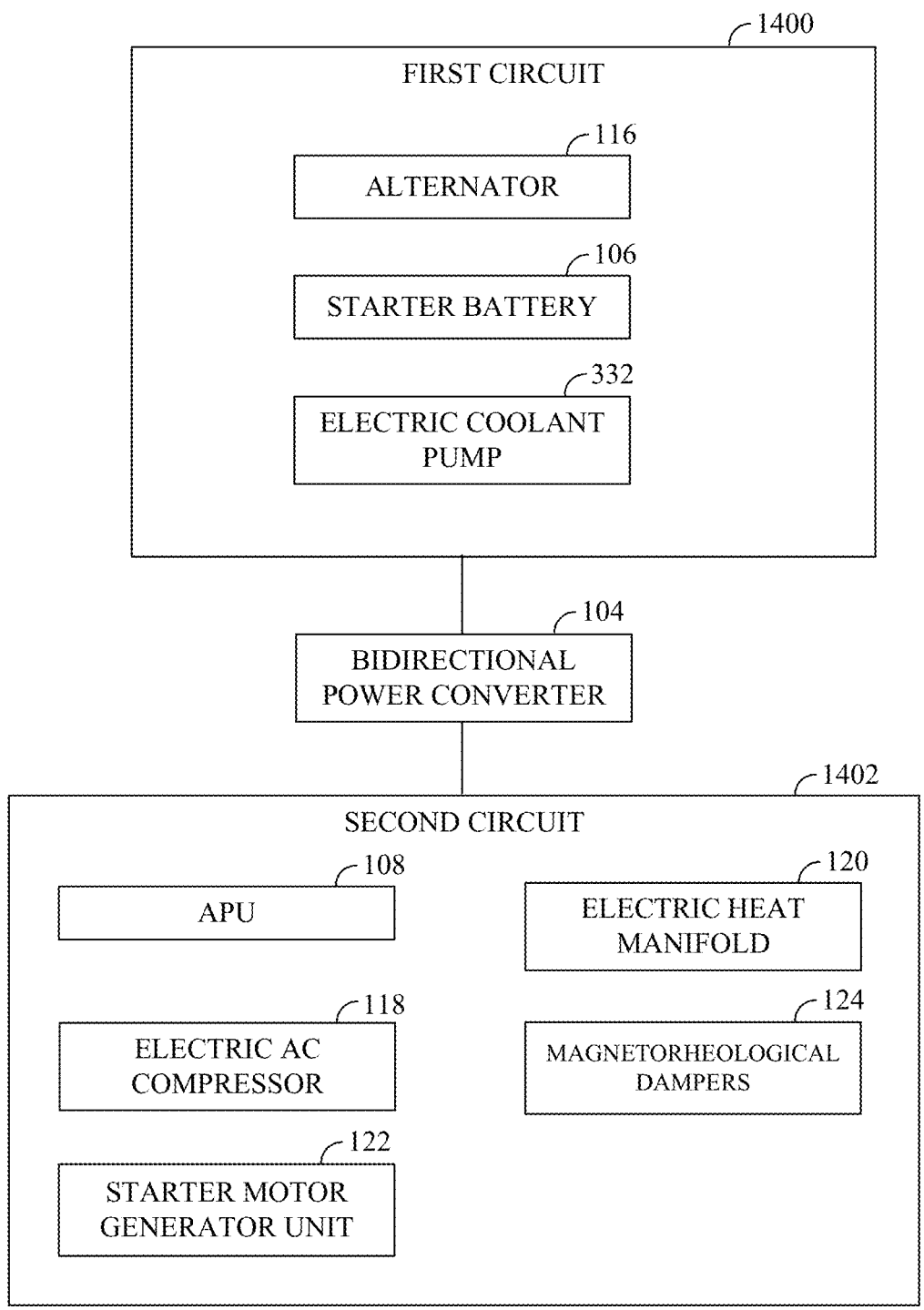
FIG. 15 is a block diagram of the vehicle power control system of FIG. 1 in a second arrangement with components of the vehicle.

In FIG. 15, a second arrangement is shown where the alternator 116, the electric coolant pump 332, and the starter battery 106 are in electrical communication with the first circuit 1400. The alternate power unit 108, the electric air conditioning compressor 118, the electric heater manifold 120, the starter motor generator unit 122, and the magnetorheological dampers 124 are in electrical communication with the second circuit 1402. The first circuit 1400 and the second circuit 1402 are connected through the bidirectional power converter 104.

This arrangement is different from the first arrangement of FIG. 14 in that the alternate power unit 108 operates at the second voltage, not the first voltage. Accordingly, only differences in operation from the first arrangement are described.

The system controller 1336 converts energy from the alternator 116 at the first voltage to the second voltage using the bidirectional power converter 104 and supplies the energy to the alternate power unit 108 in response to a determination that a state of charge of the alternate power unit 108 is below a minimum charge. If the state of charge of the alternate power unit 108 is above the minimum charge, the system controller 1336 can allow the alternate power unit 108 to supply energy directly to the electric air conditioning compressor 118 as needed. If the state of charge of the alternate power unit 108 is above the minimum charge, the system controller 1336 can allow the alternate power unit 108 to supply energy to the starter battery 106, as needed, by converting energy from the alternate power unit 108 at the second voltage to the first voltage using the bidirectional power converter 104.

Figure 16:
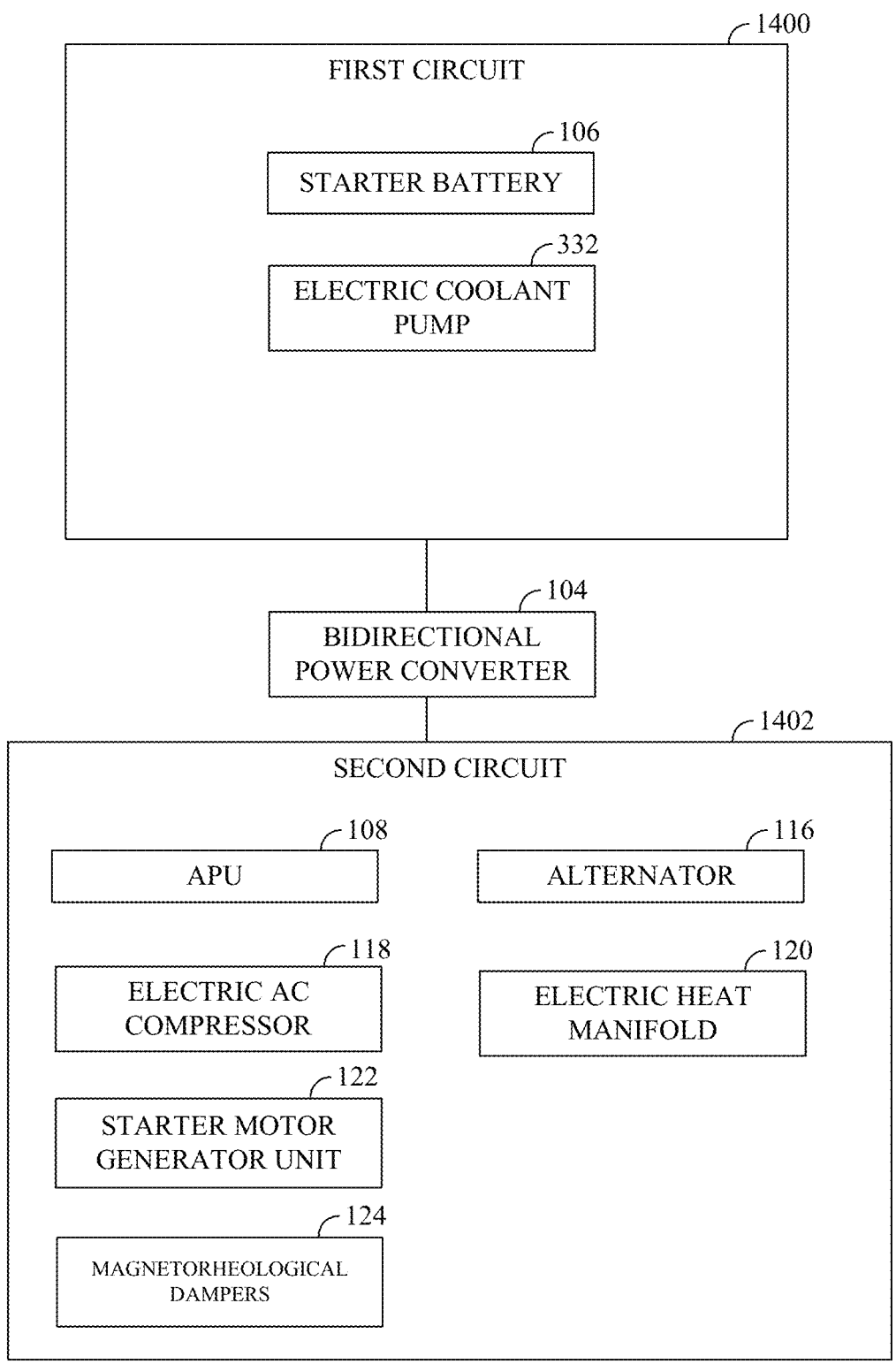
FIG. 16 is a block diagram of the vehicle power control system of FIG. 1 in a third arrangement with components of the vehicle.

In FIG. 16, a third arrangement is shown where the starter battery 106 and the electric coolant pump 332 are in electrical communication with the first circuit 1400. The alternate power unit 108, the alternator 116, the electric air conditioning compressor 118, the electric heater manifold 120, the starter motor generator unit 122, and the magnetorheological dampers 124 are in electrical communication with the second circuit 1402. The first circuit 1400 and the second circuit 1402 are connected through the bidirectional power converter 104.

This arrangement is different from the first arrangement of FIG. 14 and the second arrangement of FIG. 15 in that both the alternate power unit 108 and the alternator 116 operate at the second voltage, not the first voltage. Accordingly, the only difference in operation from the second arrangement is that the system controller 1336 supplies energy from the alternator 116 to the alternate power unit 108 without participation of the bidirectional power converter 104 in response to a determination that the state of charge of the alternate power unit 108 is below a minimum charge.

Figure 17:
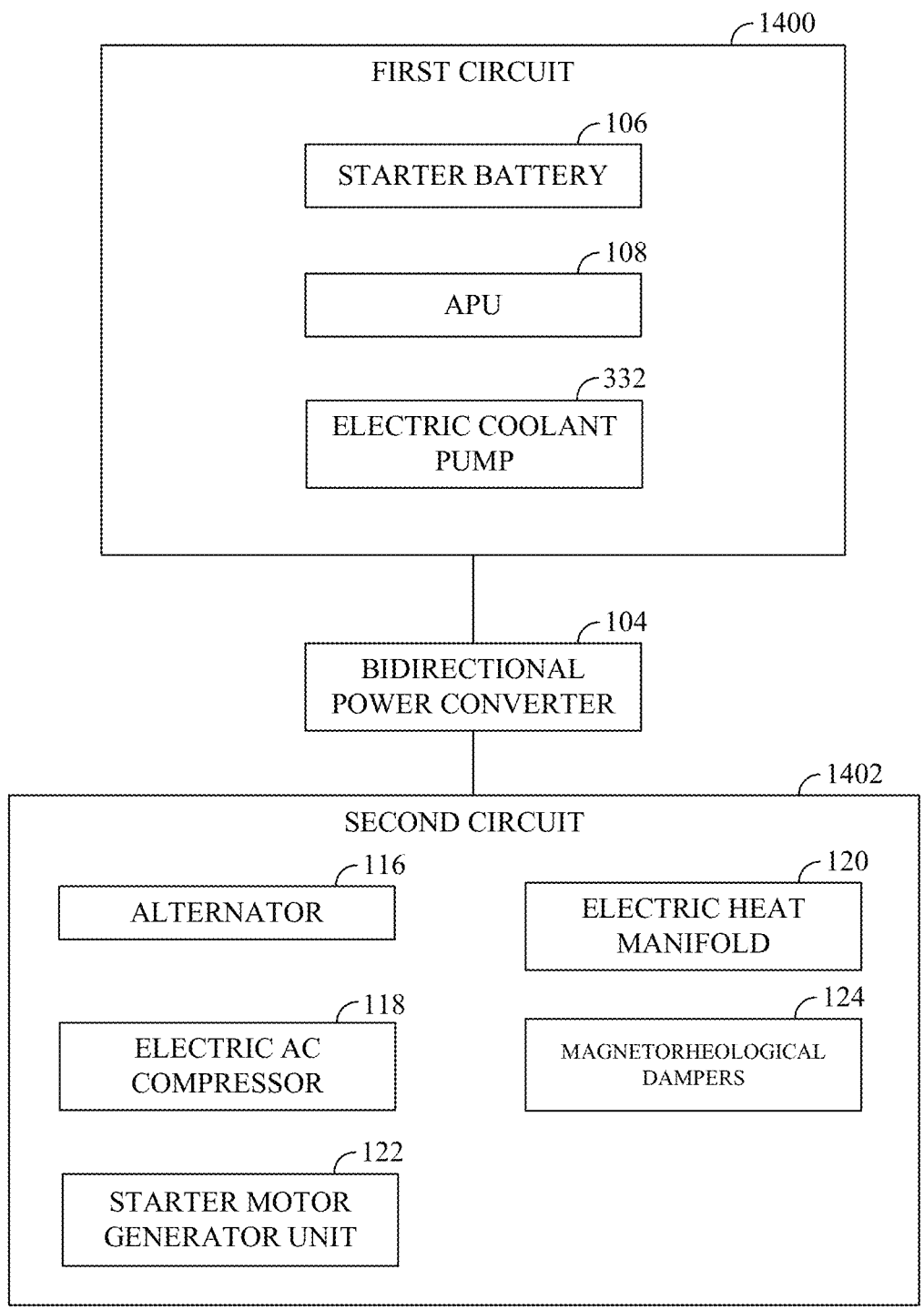
FIG. 17 is a block diagram of the vehicle power control system of FIG. 1 in a fourth arrangement with components of the vehicle.

In FIG. 17, a fourth arrangement is shown where the alternate power unit 108, the electric coolant pump 332, and the starter battery 106 are in electrical communication with the first circuit 1400. The alternator 116, the electric air conditioning compressor 118, the electric heater manifold 120, the starter motor generator unit 122, and the magnetorheological dampers 124 are in electrical communication with the second circuit 1402. The first circuit 1400 and the second circuit 1402 are connected through the bidirectional power converter 104.

The fourth arrangement is different from the first arrangement of FIG. 14 in that the alternator 116 operates at the second voltage, not the first voltage. Accordingly, the only differences in operation from the first arrangement is that the system controller 1336 causes the bidirectional power converter 104 to convert energy from the alternator 116 at the second voltage to the first voltage and supply the energy to the alternate power unit 108 in response to the determination that the state of charge of the alternate power unit 108 battery is below a minimum charge.

While the electric heater manifold 120 is shown operating at the second voltage and in electrical communication with the second circuit 1402 in FIGS. 14-17, the electric heater manifold 120 may operate at the first voltage and be in electrical communication with the first circuit 1400.

In any of these arrangements, the HVAC controller 208, the system controller 1336, or both, receive a signal indicative of the temperature of the passenger compartment 202 (e.g. from a cabin temperature sensor 1364). In response to a determination that the engine 102 is off, and that the temperature of the passenger compartment 202 is above a maximum cooling temperature, the HVAC controller 208 may supply energy from the alternate power unit 108 to the electric air conditioning compressor 118, either directly or through the bidirectional power converter 104. A sensor, such as the sensor 204, can measure the temperature of the passenger compartment 202 and communicate the signal indicating the temperature. In some embodiments, a vehicle occupant may generate the signal to activate the electric air conditioning compressor 118 by activating the OEM cooling system 210. The ECU 206 may generate the signal to activate the electric air conditioning compressor 118 via the CANbus.

However, when the signal to activate the electric air conditioning compressor 118 is generated, the measured temperature may also be compared to a minimum cooling temperature. The minimum cooling temperature, like the maximum cooling temperature, may be selected by a vehicle occupant or may be otherwise defined by the system. If the measured temperature is below than the minimum cooling temperature, or the measure temperature is equal to a selected temperature, the HVAC controller 208 may turn off the electric air conditioning compressor 118 and/or stop supplying energy from the alternate power unit 108 to the electric air conditioning compressor 118.

The HVAC controller 208 may determine whether a temperature of the passenger compartment 202 is below a minimum heating temperature in response to receiving a signal indicative of the temperature. The signal may be received in one or more ways as described above. In response to a determination that the engine 102 is off and that the temperature of the passenger compartment 202 is below the minimum heating temperature, the system controller 1336 may supply energy from the alternate power unit 108 to the electric heater manifold 120 and the electric coolant pump 332 and activate fans of the OEM cooling system 210 and/or the OEM heating system 212. The HVAC controller 208 may turn off the electric heater manifold 120 and the electric coolant pump 332 and/or stop supplying energy from the alternate power unit 108 to the electric heater manifold 120 and the electric coolant pump 332 in response to determining that the measured temperature is greater than a maximum heating temperature or equal to a selected temperature. The minimum heating temperature and the maximum heating temperature may be selected by a vehicle occupant or may be otherwise defined by the system. The minimum heating temperature may be equal to or different from the minimum cooling temperature. The maximum heating temperature may be equal to or different from the maximum cooling temperature.

The vehicle power control system 100 can activate when the system controller 1336 determines that one or more system startup conditions have been met. System startup conditions may include, but are not limited to: activation by the vehicle occupant of the system on/off switch 1358; the vehicle transmission shifted into park (a park position sensor 1362 may detect the vehicle transmission shifted into a park position); lack of engagement of the brake pedal as indicated by the brake sensor 1320; the state of charge of the alternate power unit 108 being above a minimum charge; the state of charge of the starter battery 106 being at or above a minimum charge; presence of a vehicle occupant inside the passenger compartment 202 (e.g., as indicated by the motion sensor input 1356); a hood latch in a closed position as indicated by the hood sensor 1322; the engine 102 being off; an off position of the ignition 1316; or the ignition key being inserted and removed from the ignition 1316. The startup conditions may include all of the described conditions, any one of the described conditions, or any combination of any of the described conditions. Sensors that measure one or more values indicative of the described startup conditions may communicate their signals to the system controller 1336 or any other controller for communication to the system controller 1336. For example, the brake sensor 1320 and hood sensor 1322, or any other component of the vehicle 200, may communicate with the ECU 206, which passes their signals through the connector 1300 to the system controller 1336. The system controller 1336 determines whether the one or more startup conditions are satisfied based on the received signals. The startup conditions may be predetermined or may be set or customized by the vehicle occupant.

The vehicle power control system 100 may activate after the system controller 1336 determines that one or more safety parameters have been met. Safety parameters may include: the first voltage associated with the first circuit 1400 being within a first voltage range; the second voltage associated with the second circuit 1402 being within a second voltage range, where the first voltage range may or may not be equal to the second voltage range; a resistance to ground associated with the first circuit 1400 being less than a first ground resistance value; a resistance to ground associated with the second circuit 1402 being less than a second ground resistance value that may or may be equal to the first ground resistance value; a temperature associated with any component of the vehicle power control system 100 being within a respective temperature range; and continuity of a high-voltage interlock loop (HVIL). The HVIL may be integrally connected to any described component which may also include HVIL headers that can be bypassed.

The first voltage range and the second voltage range may include any range of voltage indicating normal operation of one or more components of the first circuit 1400 and the second circuit 1402, respectively. The first ground resistance value and the second ground resistance value may be any ground resistance value of the first circuit 1400 and the second circuit 1402, respectively. A temperature range of any vehicle power system component may indicate whether it is safe to activate the component. One or more sensors may be adapted to measure values indicative of the described safety parameters. For example, the temperature sensor 514 indicates the temperature of the alternate power unit 108, and the first circuit sensor 1314 indicates the voltage of the starter battery 106. The system controller 1336 may determine whether safety parameters are satisfied based on the signals received from the sensors. The safety parameters may be predetermined or may be set or customized by the user. The safety parameters may include all of the described parameters, any one of the described parameters, or any combination of two or more of the described parameters.

In response to determining that the startup conditions and the safety parameters are met, the system controller 1336 may activate the vehicle power control system 100 and shut off the engine 102 if it is not already off. For example, the vehicle power control system 100 remains off when none of the startup conditions are satisfied, whether or not the safety parameters are satisfied. Further, if one or more startup conditions are satisfied, the vehicle power control system 100 may remain off if any of the safety parameters are not satisfied. When more than one startup condition and more than one safety parameter is used to determine whether or not to activate the vehicle power control system 100, each of the startup conditions and each of the safety parameters may be tested concurrently or sequentially. When tested sequentially, testing the startup conditions to start the vehicle power control system 100 may stop once a startup condition is not satisfied. When tested sequentially, testing the safety parameters to start the vehicle power control system 100 may stop once a safety parameter is not satisfied.

One example of a set of startup conditions that indicate that the vehicle power control system 100 should activate includes when the system controller 1336 receives signals from one or sensors and/or the ECU 206 indicating that the vehicle transmission is shifted into park, the engine 102 is running, the ignition key is in the ignition 1316, and the ignition 1316 is in the on position. The system controller 1336 may then determine whether one or more safety parameters are also satisfied or met. A start delay (or activation) period may be used in the startup of the vehicle power control system 100. For example, in response to determining that the one or more startup conditions are met and that the one or more safety parameters have been met, the system controller 1336 can activate the vehicle power control system 100 and turn the engine 102 off after the start delay period has expired. The system controller 1336 could instead wait for the start delay period to pass before considering the safety parameters, such that the vehicle power control system 100 starts after the safety parameters are met without further delay. The start delay period may be any time period. The start delay period may be predetermined, or may be selected or customized by a vehicle occupant.

Another example of a set of startup conditions that indicate that the vehicle power control system 100 should activate includes when the system controller 1336 receives signals from one or sensors and/or the ECU 206 indicating that a vehicle occupant or other user has engaged the system on/off switch 1358 and that the ignition key has been removed from the ignition 1316. In response to determining that these startup conditions are met and that the one or more safety parameters have been met, the system controller 1336 activates the vehicle power control system 100.

In some embodiments, the vehicle power control system 100 may include a status indicator 1366 that may or may not be associated with the system on/off switch 1358. The status indicator 1366 may include a light (e.g. LED light), an audible notification, or a notification output by a display screen. For example, where signals indicate that the engine 102 is off, the ignition key is in the ignition 1316, and the ignition 1316 is in the off position, the system controller 1336 may control the status indicator 1366 to output a notification during a reminder time period of a defined length to remind the vehicle occupant that the vehicle power control system 100 may be activated. The system controller 1336 may control the status indicator 1366 to output any desired conditions. For example, the status indicator 1366 can output a notification indicating that the vehicle power control system 100 is activated or deactivated.

An ignition key may be removed from an ignition 1316 while the vehicle power control system 100 operates the electric air conditioning compressor 118 and/or the electric heater manifold 120. The engine 102 may be running or not running. The system controller 1336 may initiate a delay period when the ignition key is removed from the ignition 1316 during operation of the vehicle power control system 100. If the delay period expires before the system on/off switch 1358 is engaged, the vehicle power control system 100 may turn off. If the system on/off switch 1358 is engaged within the delay period, the vehicle power control system 100 may continue to operate uninterrupted. This results in continued operation of the electric air conditioning compressor 118 and/or the electric heater manifold 120 while the ignition key is removed from the ignition 1316 and while the vehicle's transmission selector remains locked. When the system on/off switch 1358 is engaged, the first ignition relay may be activated (e.g., to allow the engine accessories to operate).

As is clear from this example, the vehicle power control system 100 may shut down when the system controller 1336 determines that one or more shut-down conditions have been met or satisfied. System shut-down conditions may include, but are not limited to: engagement of the system on/off switch 1358; engagement of the brake pedal as indicated by the brake sensor 1320; the state of charge of the alternate power unit 108 being less than a minimum charge; the state of charge of the starter battery 106 being less than a minimum charge; lack of presence of any vehicle occupant inside the passenger compartment 202, such as by indication of the motion sensor input 1356 or other occupancy sensor; the hood latch being in an open position as indicated by the hood sensor 1322; the engine speed or the engine 102 being on; an on position of the ignition 1316; activation of an inertial switch 1374 configured to detect physical disruption of the vehicle power control system 100 (e.g. vibration or impact resulting from a vehicle collision); or the ignition key location. In some embodiments, if the system on/off switch 1358 has been engaged and the brake pedal is engaged, the system controller 1336 may cause the engine 102 to restart.

The vehicle power control system 100 may also include a system run-time. Once the vehicle power control system 100 is activated, the system controller 1336 may deactivate the vehicle power control system 100 once the system run-time has expired. The system run-time may be a time period of any length. The system run-time and the shut-down conditions may be predetermined or may be set by the user. The shut-down conditions may include all of the described conditions, any one of the described conditions, or any combination of two or more of described conditions. Once deactivated, the vehicle power control system 100 may stop supplying energy from any of the power sources to any component and/or stop voltage conversion between the first circuit 1400 and the second circuit 1402 as described previously. The system controller 1336 may also restart the engine 102 in response to one or more of the shut-down conditions being satisfied, as long as the safety conditions are still satisfied.

The vehicle power control system 100 may be operated in an auto-mode, a manual-mode, and a safe-mode. The vehicle power control system 100 may include all, any one, none, or any combination of these modes. Each mode may be activated by different startup conditions and may include different system monitoring and system shutdown functions. The status indicator 1366 may output a notification indicating whether the vehicle power control system 100 is operated in activated auto-mode, manual-mode, or safe-mode.

The system controller 1336 may enable auto-mode in response to determining that the engine 102 is off, that the ignition key is in the ignition 1316, that the vehicle transmission is shifted to park, and that no signal has been received from the system on/off switch 1358. In response to enabling auto-mode, the system controller 1336 activates the vehicle power control system 100, begins a system run-timer, enables electric HVAC (e.g. enables activation of the electric air conditioning compressor 118 and/or the electric heater manifold 120) and closes a vehicle blend door. A blend door position sensor 1370 may detect the position of the blend door and transmit a signal indicative of the position of the blend door to the system controller 1336. A blend door motor driver 1372 may actuate the blend door. If electric HVAC is unavailable, (e.g. the state of charge of the starter battery 106 and/or the state of charge of the alternate power unit 108 is depleted) the system controller 1336 may open the vehicle recirculation door. After the system run-timer expires, the system controller 1336 deactivates the vehicle power control system 100, opens the vehicle air recirculation door, and may restart the engine 102.

In auto-mode, the system controller 1336 may shut down the vehicle power control system 100 and optionally restart the engine 102 in response to receiving a signal from one or more sensors indicating that: the engine 102 is on; the brake pedal is not depressed as indicated by the brake sensor 1320; the vehicle transmission is not in park; the state of charge of the alternate power unit 108 is less than a minimum charge; the state of charge of the starter battery 106 is less than a minimum charge; the hood latch is in the open position as indicated by the hood sensor 1322; or the ignition key is removed from the ignition 1316. Additionally, or alternatively, the system controller 1336 may restrict movement of moving components inside an engine 102 compartment, including but not limited to HVAC fans (e.g., the front and rear evaporator fans 1306, 1308 and the condenser fan 1310), responsive to receiving a signal from the hood sensor 1322 (e.g., through the ECU 206) indicative of the hood latch being open.

The system controller 1336 may enable manual-mode in response to determining that the engine 102 is off, that the ignition key is in the ignition 1316, that the vehicle transmission is shifted to park, and that the system on/off switch 1358 has been engaged. In response to enabling manual-mode, the system controller 1336 activates the vehicle power control system 100, enables electric HVAC (e.g. enables activation of the electric air conditioning compressor 118 and/or the electric heater manifold 120), and closes the vehicle recirculation door. If electric HVAC is unavailable, (e.g. the state of charge of the starter battery 106 and/or the state of charge of the alternate power unit 108 is depleted) the system controller 1336 may open the vehicle recirculation door.

In manual-mode, the system controller 1336 may shutdown the vehicle power control system 100 and may restart the engine 102 in response to receiving a signal from one or more sensors that indicate that: the brake pedal is engaged as indicated by the brake sensor 1320; the vehicle transmission is not in park; the state of charge of the alternate power unit 108 is less than a minimum charge; the state of charge of the starter battery 106 is less than a minimum charge; or a hood latch in an open position as indicated by the hood sensor 1322. Additionally, or alternatively, the system controller 1336 may restrict movement of moving components inside an engine compartment, including but not limited to HVAC fans (e.g., the front and rear evaporator fans 1306, 1308 and the condenser fan 1310), responsive to receiving a signal from the hood sensor 1322 (e.g., through the ECU 206) indicative of the hood latch being open.

The system controller 1336 may enable safe-mode in response to determining that the engine 102 is off, that the ignition key is not in the ignition 1316, that the vehicle transmission is shifted to park, that no signal has been received from the system on/off switch 1358, and that at least one occupant is present inside the passenger compartment 202. In response to enabling safe-mode, the system controller 1336 activates the vehicle power control system 100, enables electric HVAC (e.g. enables activation of the electric air conditioning compressor 118 and/or the electric heater manifold 120) and closes the vehicle recirculation door. If electric HVAC is unavailable, (e.g. the state of charge of the starter battery 106 and/or the state of charge of the alternate power unit 108 is depleted) the system controller 1336 may open the vehicle recirculation door.

In safe-mode, the system controller 1336 may shut-down the vehicle power control system 100 in response to receiving a signal from one or more sensors indicating that: the brake pedal is depressed as indicated by the brake sensor 1320; the vehicle transmission is no longer in park; the state of charge of the alternate power unit 108 is less than a minimum charge; or the state of charge of the starter battery 106 is less than a minimum charge. Additionally, or alternatively, the system controller 1336 may prohibit engine starting and/or restrict movement of moving components inside an engine compartment, including but not limited to HVAC fans (e.g., the front and rear evaporator fans 1306, 1308 and the condenser fan 1310) responsive to receiving a signal from the hood sensor 1322 (e.g., through the ECU 206) indicative of the hood latch being open.

In the illustrated, non-limiting example shown in FIG. 13, the ignition 1316, the body control module 1318, the park position sensor 1362, the brake sensor 1320, the cabin temperature sensor 1364, the status indicator 1366, the on/off switch 1358, the blend door position sensor 1370, and the blend door motor driver 1372 may be included in an ignition interface module 1378.

As shown in FIGS. 14-17, the starter motor generator unit 122 and magnetorheological dampers 124 may be included in any of the shown arrangements. The system controller 1336 utilized to control energy generation and power management controls for the electric air conditioning compressor 118 and the electric heater manifold 120 may optionally be used to power the magnetorheological dampers 124 and/or the starter motor generator unit 122, by which to optimize stop/start performance and motive power to the vehicle 200, as well as electric co-generation when appreciably coupled to the engine crankshaft.

The magnetorheological dampers 124 and start/stop hybrid benefits provided by the starter motor generator unit 122 may also be included where integrated electric/mechanical air conditioning is not included, i.e., the electric air conditioning compressor 118 and the electric heater manifold 120 and their associated components are not included. In either case, a rotatable shaft of the starter motor generator unit 122 may be operably coupled to the crankshaft so that the starter motor generator unit 122 can be used as an electric motor for stop/start and/or hybrid drive assist, and, when reversed, the starter motor generator unit 122 can be used as a generator that charges alternate power unit batteries, such as the rechargeable batteries 500, and/or the starter battery 106, and provides maximum regenerative electric braking and battery recharge effect.

The magnetorheological dampers 124 may be implemented at a higher voltage, such as the higher (e.g., 48-volt) voltage of the second circuit. The starter motor generator unit 122 may be implemented at a higher voltage, such as the higher (e.g., 48-volt) voltage of the second circuit, for improved stop/start benefits. This allows a system that boosts a lower voltage output of an alternator 116 to the higher voltage without high voltage battery support. That is, an alternate power unit 108 operating at the higher voltage may be omitted. This is desirable due to the difficulty in placement of a high-voltage alternate power unit and its cost.

The vehicle power control system 100 may be operably coupled to both the starter motor generator unit 122 and the bidirectional power converter 104 such that the system controller 1336 can directly or indirectly through a starter motor controller issue a start command when the system controller 1336 determines that the engine 102 should be restarted. To restart the engine 102, the system controller 1336 may activate the second ignition relay and deactivate the first ignition relay. Then, the third ignition relay may be activated to start the engine 102. When the engine 102 restarts, the system controller 1336 may activate the first ignition relay and deactivate the third ignition relay.

In embodiments of the vehicle power control system 100 including the magnetorheological damper 124 and/or the starter motor generator unit 122, which may also be referred to as the starter motor, a power source having the first voltage (e.g., 12 volts) may be in electrical communication with the first circuit 1400. The power source may include the starter battery 106, the alternate power unit 108, any other battery, or any combination thereof. The starter motor generator unit 122 and/or the magnetorheological damper 124 having the second voltage (e.g., 48 volts) may be in electrical communication with the second circuit 1402, where the second voltage is higher than the first voltage.

The bidirectional power converter 104 in electrical communication with the power source, the starter motor generator unit 122, and/or magnetorheological damper 124 (and in electrical communication with the first circuit 1400 and the second circuit 1402) may be configured to convert the first voltage to the second voltage as previously described. The system controller 1336 may be configured to supply energy from the power source to the starter motor generator unit 122 to start the engine 102, which may be an internal combustion engine. The system controller 1336 may also be configured to supply energy from the power source to the magnetorheological damper 124 to provide active suspension to the vehicle 200. For example, the system controller 1336 may be configured to supply energy from the power source to the starter motor generator unit 122 in response to receiving a signal indicative of a request to start the engine 102 from the ECU 206. In another example, the system controller 1336 may be configured to supply energy from the power source to the magnetorheological damper 124 in response to receiving a signal indicative of a request from the ECU 206. The system controller 1336 may also be configured to control the buck-boost converter 110 and/or energize the bidirectional power converter 104 to initiate conversion of energy from the first voltage to the second voltage in response to receiving the signal indicative of the request to start the engine 102. Further, the system controller 1336 may be configured to supply energy only from the power source at the first voltage to the starter motor generator unit 122 and/or the magnetorheological damper 124 at the second voltage to start the engine 102, eliminating the need for a power source at the second voltage.

The starter motor generator unit 122 may be configured to generate energy from the crankshaft of the engine 102. The bidirectional power converter 104 may be configured to convert the second voltage to the first voltage as previously described, and the system controller 1336 may be configured to supply energy from the starter motor generator unit 122 to the power source. For example, the system controller 1336 may be configured to supply energy from the starter motor generator unit 122 to the power source in response to a determination by the system controller 1336 that a charge of the power source is below a threshold. Charge may be indicated by current, voltage, battery electrolyte specific gravity, any other measurable value associated with the power source, or any combination thereof.

The power source may include the starter battery 106 and the alternate power unit 108 at the first voltage. The system controller 1336 may be configured to, after the engine 102 is started, end supply of energy from the starter battery 106 to the starter motor generator unit 122 and supply energy from the alternate power unit 108 to the starter motor generator unit 122. This reduces demand on the starter battery 106 and allows the starter motor generator unit 122 to apply hybrid electric motive power to assist the engine 102.

A process of controlling power in the vehicle as it relates to the starter motor generator unit 122 may include supplying energy from the power source having the first voltage to the bidirectional power converter 104 in response to receiving the signal indicative of the request to start the engine 102. The process may include converting the first voltage to the second voltage using the bidirectional power converter 104, where the second voltage is more than the first voltage. In some embodiments, the process includes energizing the bidirectional power converter 104 to convert the energy from the first voltage to the second voltage. The process may include supplying only the energy from the power source to the starter motor generator unit 122 and/or the magnetorheological damper 124 having the second voltage.

The process may include supplying energy from the starter motor generator unit 122 to the bidirectional power converter 104 in response to a determination that the charge of the power source is below a threshold. The process may include converting the energy from the second voltage to the first voltage using the bidirectional power converter 104. The process may include supplying the energy from the starter motor generator unit 122 to the power source.

The process may include supplying the energy from the power source to the starter motor generator unit 122 and/or the magnetorheological damper 124 after the system controller 1336 determines that the first voltage is within a first voltage range. Further, energy may be supplied from the starter motor generator unit 122 to the power source after the system controller 1336 determines that the second voltage is within a second voltage range.

The process may include receiving, at the system controller 1336, a signal indicative of the first voltage and a signal indicative of the second voltage. The process may include the system controller 1336 determining whether the ratio between the first voltage and the second voltage is equal to a predetermined ratio. In response to determining that the ratio between the first voltage and the second voltage is not equal to the predetermined ratio, the system controller 1336 and may adjust the flow of energy between the power source and the starter motor generator unit 122 and/or the magnetorheological damper 124 using the bidirectional power converter 104.

The process may include isolating the bidirectional power converter 104 from the first circuit 1400 and/or the second circuit 1402 in response to the system controller 1336 determining at least one of the following: the first voltage is not within the first voltage range, the second voltage is not within the second voltage range, no energy demand exists at the first circuit 1400, or no energy demand exists at the second circuit 1402.

The process may include the system controller 1336 ending supply of energy from the starter battery 106 having the first voltage to the starter motor generator unit 122 and/or the magnetorheological damper 124 having the second voltage after the engine 102 is started. After the supply of energy from the starter battery 106 is ended, energy may be supplied from the alternate power unit 108 having the first voltage to the starter motor generator unit 122 and/or the magnetorheological damper 124. Energy may also be supplied from the starter motor generator unit 122 to the alternate power unit 108 in response to the system controller 1336 determining that the charge of the alternate power unit 108 is below the threshold.

The physical vehicle improvements and controls described herein provide a number of benefits to vehicle operation. Vehicle idle reduction systems using primary and/or secondary alternators that operate at a lower voltage (e.g., 12 or 24 volts) are often limited to powering vehicle accessories operating at the lower voltage. Such systems reduce fuel efficiency, increase vehicle emissions, and place a parasitic energy demand on the engine of the vehicle engine. The vehicle power control system described herein enables a low-voltage alternator to power high-voltage (e.g., 48 volts or more) vehicle accessories without high-voltage battery support.

Vehicle systems often require high-voltage battery support to power high-voltage vehicle accessories such as HVAC systems. The vehicle power control system described herein enables the use of high-voltage vehicle accessories without high-voltage battery support, reducing the need for engine compartment space, reducing vehicle weight, and reducing battery installation and replacement costs.

Due to the increasing cost of electricity, it is expensive to maintain the electricity required for recharging fleets of electric vehicles. The vehicle power control system described herein may be applied to hybrid electric vehicles and enables the automatic recharging of starter batteries and/or alternate power units.

Vehicle idle reduction systems may use a secondary alternator and a modified belt and pulley system to charge starter batteries and/or alternate power units. Such devices place a strain on the belt and related components and create parasitic demand on the engine that reduces effective power, lowers fuel efficiency, and increases engine emissions. By using the teachings herein, a secondary alternator may be omitted.

Implementations of the system controller 1336, the HVAC controller 208, the electric compressor motor controller 330, the bidirectional power converter controller 1330, the power management controller 1360, and/or any other described controller (and the algorithms, methods, instructions, etc., stored thereon and/or executed thereby) can be realized in hardware, software, or any combination thereof. The hardware can include, for example, computers, application-specific integrated circuits (ASICs), programmable logic arrays, optical processors, programmable logic controllers, microcode, microcontrollers, servers, microprocessors, digital signal processors, printed circuit boards, or any other suitable circuit. The term "processor" or "controller" should be understood as encompassing any of the foregoing hardware, either singly or in combination. Further, portions of the controllers do not necessarily have to be implemented in the same manner.

Further, in one aspect, for example, one or more of the controllers can be implemented using a general-purpose computer or general-purpose processor with a computer program that, when executed, carries out any of the respective methods, algorithms and/or instructions described herein. In addition, or alternatively, for example, a special purpose computer/processor can be utilized that contains other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

While the disclosure includes certain embodiments, the disclosure is not to be limited to the described embodiments but is intended to cover modifications and equivalent configurations included within the scope of the appended claims. The scope of the appended claims is to be accorded the broadest interpretation as is permitted under the law so as to encompass all such modifications and equivalent configurations.

What is claimed is:

1. A vehicle power control system, comprising:
   a battery having a first voltage;
   a first circuit in electrical communication with the battery, wherein the first circuit operates at the first voltage;
   a starter motor having a second voltage, wherein the starter motor is coupled to a crankshaft of an internal combustion engine;
   a second circuit in electrical communication with the starter motor, wherein the second circuit operates at the second voltage;
   a power converter in electrical communication with the battery and the starter motor, wherein the power converter is configured to convert the first voltage to the second voltage, the power converter is a bidirectional power converter in electrical communication with the first circuit and the second circuit, and the bidirectional power converter is configured to convert the second voltage to the first voltage; and
   a system controller configured to supply energy from the battery to the starter motor to start the internal combustion engine, wherein the second voltage is greater than the first voltage.

2. The vehicle power control system of claim 1, wherein the system controller is configured to supply energy only from the battery to the starter motor to start the internal combustion engine, and wherein the power converter maintains at least a 4:1 ratio between the first voltage and the second voltage.

3. The vehicle power control system of claim 1, wherein:
   the bidirectional power converter maintains a ratio between the first voltage and the second voltage;
   the system controller receives a signal indicative of the first voltage and a signal indicative of the second voltage;
   the system controller is configured to determine whether the ratio between the first voltage and the second voltage is equal to a predetermined ratio; and
   the bidirectional power converter is configured to, in response to a determination that the ratio between the first voltage and the second voltage is not equal to the predetermined ratio, convert energy between the first circuit and the second circuit.

4. The vehicle power control system of claim 1, wherein the starter motor is configured to generate energy from the crankshaft of the internal combustion engine, and wherein the system controller is configured to supply energy from the starter motor to the battery.

5. The vehicle power control system of claim 4, wherein the bidirectional power converter is configured to:
convert the first voltage to the second voltage in response to an energy demand at the second circuit and in response to a determination that the first voltage is within a first voltage range; and
convert the second voltage to the first voltage in response to an energy demand at the first circuit and in response to a determination that the second voltage is within a first voltage range.

6. The vehicle power control system of claim 1, further comprising:
an alternate power unit having the first voltage, wherein:
the alternate power unit is in electrical communication with the first circuit,
the system controller is configured to, after the internal combustion engine is started, end supply of energy from the battery to the starter motor and supply energy from the alternate power unit to the starter motor,
the starter motor is configured to generate energy from the crankshaft of the internal combustion engine, and
the system controller is configured to supply energy from the starter motor to the alternate power unit in response to a determination that a charge of the alternate power unit is below a threshold.

7. The vehicle power control system of claim 1, further comprising a buck-boost converter configured to energize the power converter to convert energy from the first voltage to the second voltage, wherein the system controller is configured to control the buck-boost converter to energize the power converter in response to receiving a signal indicative of a request to start the internal combustion engine.

8. The vehicle power control system of claim 1, wherein the system controller is configured to isolate the bidirectional power converter from at least one of the first circuit or the second circuit in response to a determination that no energy demand exists in at least one of the first circuit or the second circuit.

9. A vehicle, comprising:
a first circuit operating at a first voltage;
a second circuit operating at a second voltage, wherein the second voltage is greater than the first voltage;
a power converter in electrical communication with the first circuit and the second circuit, wherein the power converter is configured to maintain a ratio between the first voltage and the second voltage;
a power source in electrical communication with the first circuit such that a target output of the power source is at the first voltage, the power source comprising at least one battery;
a starter motor coupled to a crankshaft of an internal combustion engine, wherein the starter motor is in electrical communication with the second circuit such that a target output of the starter motor is at the second voltage; and
a system controller configured to supply energy to the starter motor only from the at least one battery, wherein energy is supplied to the starter motor from the at least one battery in response to receiving a signal indicative of a request to start the internal combustion engine.

10. The vehicle of claim 9, wherein:
the power source further comprises an alternate power unit, the starter motor is configured to generate energy from the internal combustion engine,
the power converter is a bidirectional power converter, and
the system controller is configured to supply energy from the starter motor to the alternate power unit and to supply energy from the alternate power unit to the starter motor.

11. The vehicle of claim 10, wherein the system controller is configured to, after the internal combustion engine is started:
end supply of energy from the at least one battery to the starter motor;
supply energy from the alternate power unit to the starter motor; and
in response to a determination that a charge of the alternate power unit is below a threshold, supply energy from the starter motor to the alternate power unit.

12. The vehicle of claim 10, wherein the system controller is configured to:
supply energy from the alternate power unit to the starter motor in response to determining that the first voltage is within a first voltage range, and
supply energy from the starter motor to the alternate power unit in response to determining that the second voltage is within a second voltage range.

13. The vehicle of claim 10, wherein the system controller is configured to isolate the bidirectional power converter from at least one of the first circuit or the second circuit in response to a determination that:
the first voltage is not in a first voltage range;
the second voltage is not in a second voltage range; or
the first voltage is not in the first voltage range and the second voltage is not in the second voltage range.

14. The vehicle of claim 10, wherein the system controller is configured to isolate the bidirectional power converter from at least one of the first circuit or the second circuit in response to a determination that no energy demand exists in at least one of the first circuit or the second circuit.

15. The vehicle of claim 9, further comprising:
a buck-boost converter configured to energize the power converter to convert the first voltage to the second voltage,
wherein the system controller is configured to control the buck-boost converter to energize the power converter in response to receiving a signal indicative of a request to start the internal combustion engine, and
wherein the ratio maintained by the power converter between the first voltage and the second voltage is at least a 4:1.

16. A method of controlling power in a vehicle, comprising:
in response to receiving a signal indicative of a request to start an internal combustion engine from a sensor, supplying energy from a battery having a first voltage to a power converter;
converting the first voltage to a second voltage using the power converter, wherein the second voltage is greater than the first voltage;
supplying, to a starter motor having a second voltage, only the energy from the battery, wherein the starter motor is coupled to a crankshaft of the internal combustion engine;

in response to a determination that a charge of the battery is below a threshold, supplying energy from the starter motor to the power converter, wherein the power converter is a bidirectional power converter;

converting the energy from the second voltage to the first voltage using the bidirectional power converter; and supplying the energy from the starter motor to the battery.

17. The method of claim 16, wherein:

supplying the energy from the battery to the starter motor occurs after a determination that the second voltage is within a first voltage range, and supplying energy from the starter motor to the battery occurs after a determination that the second voltage is within a second voltage range.

18. The method of claim 16, further comprising:

energizing, using a buck-boost converter, the power converter to convert the energy from the first voltage to the second voltage;

receiving a signal indicative of the first voltage;

receiving a signal indicative of the second voltage;

determining whether a ratio between the first voltage and the second voltage is equal to a predetermined ratio; and in response to determining that the ratio between the first voltage and the second voltage is not equal to the predetermined ratio, adjusting a flow of energy between the battery and the starter motor using the bidirectional power converter.

* * * * *